(12) United States Patent
Atkinson et al.

(10) Patent No.: US 12,143,404 B2
(45) Date of Patent: Nov. 12, 2024

(54) CYBER DEFENCE SYSTEM

(71) Applicant: Senseon Tech Ltd, London (GB)

(72) Inventors: David Atkinson, London (GB); James Mistry, London (GB)

(73) Assignee: SENSEON TECH LTD, London (GB)

( * ) Notice: Subject to any disclaimer, the term of this patent is extended or adjusted under 35 U.S.C. 154(b) by 765 days.

(21) Appl. No.: 17/158,862

(22) Filed: Jan. 26, 2021

(65) Prior Publication Data

US 2021/0250365 A1 Aug. 12, 2021

Related U.S. Application Data

(63) Continuation of application No. PCT/EP2019/070256, filed on Jul. 26, 2019.

(30) Foreign Application Priority Data

Jul. 26, 2018 (GB) ..................................... 1812171

(51) Int. Cl.
*H04L 9/40* (2022.01)
*H04L 41/22* (2022.01)

(52) U.S. Cl.
CPC .......... *H04L 63/1416* (2013.01); *H04L 41/22* (2013.01); *H04L 63/029* (2013.01); *H04L 63/1425* (2013.01); *H04L 63/20* (2013.01)

(58) Field of Classification Search
CPC ... H04L 63/1416; H04L 41/22; H04L 63/029; H04L 63/1425; H04L 63/20;
(Continued)

(56) References Cited

U.S. PATENT DOCUMENTS 8,131,846 B1 3/2012 Hernacki et al.
8,239,668 B1 8/2012 Chen et al.
(Continued)

FOREIGN PATENT DOCUMENTS

EP 3772209 A1 2/2021
EP 3800863 A1 4/2021
(Continued)

OTHER PUBLICATIONS

Balasubramaniyan et al., "An architecture for intrusion detection using autonomous agents." Proceedings 14th annual computer security applications conference (Cat. No. 98EX217). IEEE, 1998. 19 pages.
(Continued)

*Primary Examiner* — Mohammed Waliullah
(74) *Attorney, Agent, or Firm* — Knobbe, Martens, Olson & Bear, LLP

(57) ABSTRACT

A method of detecting security threats comprises: in an enrichment stage, receiving events pertaining to a monitored private network; enriching the events by augmenting them with enrichment data; and receiving, at an analysis engine, the enriched events and analysing the enriched events to detect security threat conditions indicated by the enriched events; wherein at least one of the events is enriched based on external reconnaissance by: determining a related public network address on a network interface between the private network and a public network, and augmenting the event with external reconnaissance data, as determined by transmitting at least one reconnaissance message from an external reconnaissance device on the public network to the related public network address on the network interface between the public and the private networks.

20 Claims, 14 Drawing Sheets

(58) Field of Classification Search
CPC .. H04L 61/2589; H04L 63/0227; H04L 63/14; H04W 12/121
See application file for complete search history.

(56) References Cited

U.S. PATENT DOCUMENTS

| | | |
|---|---|---|
| 9,069,954 B2 | 6/2015 | Anurag |
| 9,571,524 B2 | 2/2017 | Dotan et al. |
| 9,749,342 B1 | 8/2017 | Krage et al. |
| 9,767,663 B2 | 9/2017 | Reske |
| 9,773,112 B1 | 9/2017 | Rathor et al. |
| 9,800,605 B2 | 10/2017 | Baikalov et al. |
| 9,998,425 B2 | 6/2018 | Raman et al. |
| 10,091,235 B1 | 10/2018 | Kushwaha et al. |
| 10,104,118 B2 | 10/2018 | Wang et al. |
| 10,109,166 B1 | 10/2018 | Selinger et al. |
| 11,228,604 B2 | 1/2022 | Mistry et al. |
| 11,265,339 B1 | 3/2022 | Mistry |
| 2003/0070003 A1 | 4/2003 | Chong et al. |
| 2005/0050336 A1 | 3/2005 | Liang et al. |
| 2008/0155517 A1 | 6/2008 | Yan et al. |
| 2011/0173699 A1 | 7/2011 | Figlin et al. |
| 2012/0151588 A1 | 6/2012 | Wang et al. |
| 2012/0174228 A1* | 7/2012 | Giakouminakis ... H04L 63/1416 726/25 |
| 2012/0192003 A1 | 7/2012 | Akiyama et al. |
| 2013/0097660 A1 | 4/2013 | Pas et al. |
| 2013/0298192 A1 | 11/2013 | Kumar et al. |
| 2014/0165200 A1 | 6/2014 | Singla |
| 2015/0135262 A1 | 5/2015 | Porat et al. |
| 2015/0205956 A1* | 7/2015 | Sakurai ................. G06F 21/552 726/23 |
| 2015/0281287 A1 | 10/2015 | Gill et al. |
| 2015/0341376 A1 | 11/2015 | Nandy et al. |
| 2016/0006753 A1 | 1/2016 | McDaid et al. |
| 2016/0021056 A1 | 1/2016 | Chesla |
| 2016/0149887 A1 | 5/2016 | Katmor et al. |
| 2016/0232353 A1 | 8/2016 | Gupta et al. |
| 2016/0234241 A1 | 8/2016 | Talamanchi et al. |
| 2016/0285858 A1 | 9/2016 | Li et al. |
| 2016/0308898 A1 | 10/2016 | Teeple et al. |
| 2016/0344762 A1 | 11/2016 | Jou et al. |
| 2016/0373477 A1 | 12/2016 | Moyle et al. |
| 2016/0381049 A1 | 12/2016 | Akhani et al. |
| 2017/0063907 A1 | 3/2017 | Muddu et al. |
| 2017/0063917 A1 | 3/2017 | Chesla |
| 2017/0093902 A1 | 3/2017 | Roundy et al. |
| 2017/0214702 A1 | 7/2017 | Moscovici et al. |
| 2017/0220801 A1 | 8/2017 | Stockdale et al. |
| 2017/0251012 A1 | 8/2017 | Stockdale et al. |
| 2017/0359376 A1 | 12/2017 | Evron et al. |
| 2018/0027006 A1 | 1/2018 | Zimmermann et al. |
| 2018/0041537 A1 | 2/2018 | Bloxham et al. |
| 2018/0046928 A1 | 2/2018 | Jang et al. |
| 2018/0123864 A1 | 5/2018 | Tucker et al. |
| 2018/0183680 A1 | 6/2018 | Chen et al. |
| 2018/0183940 A1 | 6/2018 | Kosseifi et al. |
| 2018/0212879 A1 | 7/2018 | Toit et al. |
| 2018/0255076 A1 | 9/2018 | Paine |
| 2018/0316705 A1 | 11/2018 | Tsironis |
| 2018/0316713 A1 | 11/2018 | Tsironis |
| 2018/0316727 A1 | 11/2018 | Tsironis |
| 2018/0332062 A1 | 11/2018 | Ford |
| 2018/0375886 A1 | 12/2018 | Kirti et al. |
| 2019/0014141 A1* | 1/2019 | Segal ................. H04L 63/1483 |
| 2019/0052659 A1 | 2/2019 | Weingarten et al. |
| 2019/0089678 A1 | 3/2019 | Lam et al. |
| 2019/0173917 A1 | 6/2019 | Sites |
| 2019/0220626 A1 | 7/2019 | LeMasters et al. |
| 2019/0258800 A1 | 8/2019 | Ladnai et al. |
| 2019/0260764 A1 | 8/2019 | Humphrey et al. |
| 2019/0260785 A1 | 8/2019 | Jenkinson et al. |
| 2019/0266324 A1 | 8/2019 | Edwards et al. |
| 2019/0332690 A1 | 10/2019 | Gutman et al. |
| 2019/0372934 A1 | 12/2019 | Yehudai et al. |
| 2020/0143041 A1 | 5/2020 | Jung et al. |
| 2020/0186465 A1 | 6/2020 | Venkata et al. |
| 2020/0236120 A1 | 7/2020 | Monteil et al. |
| 2020/0244673 A1 | 7/2020 | Stockdale et al. |
| 2020/0274870 A1 | 8/2020 | Zinar et al. |
| 2020/0285737 A1 | 9/2020 | Kraus et al. |
| 2020/0372150 A1 | 11/2020 | Salem et al. |
| 2020/0396190 A1 | 12/2020 | Pickman et al. |
| 2021/0036002 A1 | 2/2021 | Lee |
| 2021/0064762 A1 | 3/2021 | Salji |
| 2021/0120027 A1 | 4/2021 | Dean et al. |
| 2021/0273691 A1 | 9/2021 | Huang et al. |
| 2021/0273949 A1 | 9/2021 | Howlett et al. |
| 2021/0273950 A1 | 9/2021 | Lawson |
| 2021/0273953 A1 | 9/2021 | Fellows et al. |
| 2021/0273957 A1 | 9/2021 | Boyer et al. |
| 2021/0273958 A1 | 9/2021 | McLean |
| 2021/0273959 A1 | 9/2021 | Salji |
| 2021/0273960 A1 | 9/2021 | Humphrey et al. |
| 2021/0273961 A1 | 9/2021 | Humphrey et al. |
| 2021/0273973 A1 | 9/2021 | Boyer et al. |
| 2021/0329016 A1 | 10/2021 | Atkinson et al. |
| 2021/0360027 A1 | 11/2021 | Boyer et al. |
| 2021/0397710 A1 | 12/2021 | Cohen et al. |
| 2022/0019659 A1 | 1/2022 | Salem et al. |

FOREIGN PATENT DOCUMENTS

| | | |
|---|---|---|
| KR | 20160011261 A | 2/2016 |
| WO | 2015191052 A1 | 12/2015 |
| WO | 2017160760 A1 | 9/2017 |
| WO | 2017160770 A1 | 9/2017 |
| WO | 2019038527 A1 | 2/2019 |
| WO | 2019243579 A1 | 12/2019 |
| WO | 2020021100 A1 | 1/2020 |
| WO | 2021171090 A1 | 9/2021 |
| WO | 2021171092 A2 | 9/2021 |
| WO | 2021171093 A1 | 9/2021 |
| WO | 2021171092 A3 | 10/2021 |
| WO | 2021236661 A1 | 11/2021 |
| WO | 2021236663 A1 | 11/2021 |

OTHER PUBLICATIONS

Extended European Search Report in European Patent Application No. 20217813.3 dated Jun. 28, 2021. 11 pages.

Snapp et al., "The {DIDS}(Distributed Intrusion Detection System) Prototype." {USENIX} Summer 1992 Technical Conference ({USENIX} Summer 1992 Technical Conference). 1992. 7 pages.

Caithness et al. "Anomaly detection for industrial big data." arXiv preprint arXiv:1804.02998 (2018) 9 pages.

International Search Report and Written Opinion in International Application No. PCT/EP2020/078643, mailed Feb. 1, 2021, 21 pages.

Ranshous et al. "Anomaly detection in dynamic networks: a survey." Wiley Interdisciplinary Reviews: Computational Statistics 7.3 (2015): 223-247 26 pages.

Search Report under Section 17 in United Kingdom Patent Application No. GB2200435.2 dated Feb. 18, 2022, 4 bages.

Xie et al. "Fast low-rank matrix approximation with locality sensitive hashing for quick anomaly detection." IEEE INFOCOM 2017—IEEE Conference on Computer Communications. IEEE, 2017 10 pages.

Hindy et al., "A taxonomy of malicious traffic for intrusion detection systems." 2018 International Conference on Cyber Situational Awareness, Data Analytics and Assessment (Cyber SA). IEEE, 2018. 4 pages.

International Search Report and Written Opinion in International Patent Application No. PCT/EP2019/066479 mailed Oct. 9, 2019. 14 pages.

International Search Report and Written Opinion in International Patent Application No. PCT/EP2019/070256 mailed Oct. 24, 2019. 17 pages.

* cited by examiner

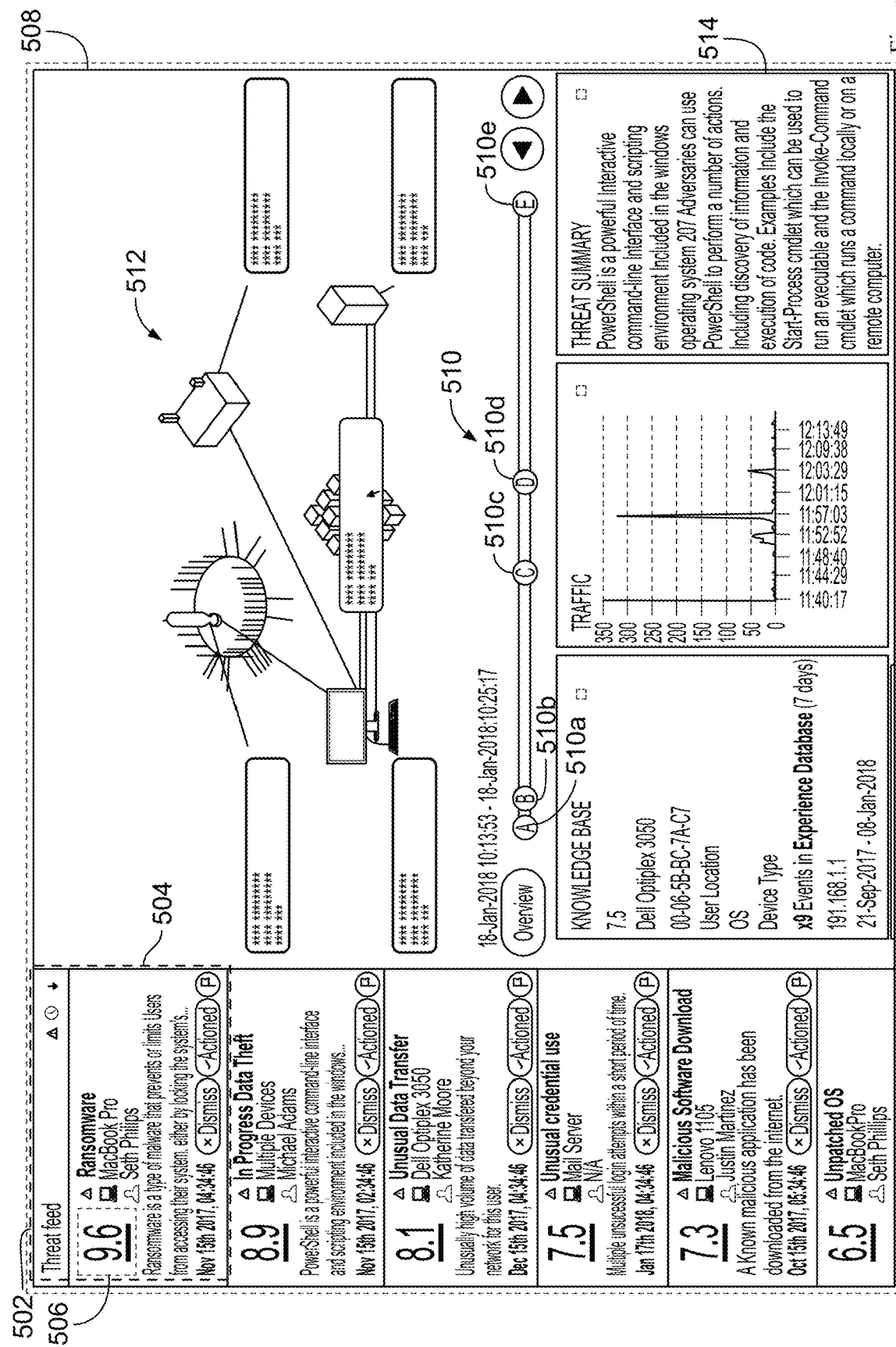

CYBER DEFENCE SYSTEM

CROSS-REFERENCE TO RELATED APPLICATIONS

The present application is a bypass continuation of PCT Application No. PCT/EP2019/070256, filed on Jul. 26, 2019, which claims priority to United Kingdom Application No. 1812171.5, filed on Jul. 26, 2018, each of which applications is incorporated herein by reference.

TECHNICAL FIELD

This disclose relates to cyber defence.

BACKGROUND

Cyber defence refers to technologies that are designed to protect computer systems from the threat of cyberattacks. In an active attack, an attacker attempts to alter or gain control of system resources. In a passive attack, an attacker only attempts to extract information from a system (generally whilst trying to evade detection). Private computer networks, such as those used for communication within businesses, are a common target for cyberattacks. An attacker who is able to breach (i.e. gain illegitimate access to) a private network may for example be able to gain access to sensitive data secured within in it, and cause significant disruption if they are able to take control of resources as a consequence of the breach. A cyberattack can take various forms. A "syntactic" attack makes use of malicious software, such as viruses, worms and Trojan horses. A piece of malicious software, when executed by a device within the network, may be able to spread throughout the network, resulting in a potentially severe security breach. Other forms of "semantic" attack include, for example, denial-of-service (DOS) attacks which attempt to disrupt network services by targeting large volumes of data at a network; attacks via the unauthorized use of credentials (e.g. brute force or dictionary attacks); or backdoor attacks in which an attacker attempts to bypass network security systems altogether.

SUMMARY

Automated threat detection present various challenges. One challenge is that it may be hard to systematically assess the threat level associated with "raw" network events when monitoring a network.

A first aspect of the present invention provides a method of detecting security threats, the method comprising the following steps:
  in an enrichment stage, receiving events pertaining to a monitored private network;
  enriching the events by augmenting them with enrichment data; and
  receiving, at an analysis engine, the enriched events and analysing the enriched events to detect security threat conditions indicated by the enriched events;
  wherein at least one of the events is enriched based on external reconnaissance by: determining a related public network address on a network interface between the private network and a public network, and
  augmenting the event with external reconnaissance data, as determined by
  transmitting at least one reconnaissance message from an external reconnaissance device on the public network to the related public network address on the network interface between the public and the private networks.

The external reconnaissance provides an "external perspective" on the private network, which is used as a basis for augmenting the event pertaining to the private network. This provides an important piece of context for the analysis, for example by linking the event with corresponding activity on the public side of the network. The existence and/or nature of such activity may be highly indicative of the threat level associated with the event in question.

As set out in further detail below, in embodiments of the invention, the events-including the augmented (enriched) event(s)—may be associated with one another into "cases".

Automated threat detection currently relies on making single observations that have a high confidence of being indicative of malicious activity. For example, identifying a particular byte pattern in a file or connection to a website not seen before. The problem with this is that for many threats, particularly unknown ones, there is simply no way to make single observations that identify the threat with sufficiently high confidence.

The case-based approach of this disclosure, in which observations (events) are associated with one another into cases, is achieved by associating events that are related by some common feature or group of features, e.g. time, device involved, user involved etc. and scoring the case as a whole according to how likely its constituent observations and their relationships are to correspond to malicious activity.

Event enrichment provides particular benefits in the context of this case-based approach. Associating related events into cases and attaching relevant context to those events (though enrichment) facilitates a deep analysis to determine the actual threat level actually represented by the set of events within a given case.

In embodiments, the events may comprise network events generated by monitoring network traffic within the network.

Alternatively or additionally, the events may comprise endpoint events generated using endpoint agents executed on endpoints of the monitored network to monitor local activity at those endpoints.

In preferred embodiments, the events may comprise network events and endpoint events and the method may comprise linking (e.g. joining) network events and endpoint events together based on at least one of: respective timestamps and respective entity identifiers in those events, wherein the security threat conditions are detected from the enriched and linked events.

The linking together of network and endpoint events has been found to provide a powerful basis for automated cyber defence analysis, due to the fact that threats often manifest themselves on both the network and the endpoints. Combining this with external reconnaissance of the network infrastructure, which provides insights as to the activity associated with a threat or potential threat on the public side of the network, provides a comprehensive view of the potential risks posed across the network and associated infrastructure.

The event that is enriched based on external reconnaissance may be a network event. That event may be linked with one or more related events, such as one or more related endpoint event. Alternatively, the event that is enriched based on external reconnaissance may be an endpoint event. That event may be linked with one or more related events, such as one or more related network events. Alternatively, the event that is enriched may be a joined network event created by joining two or more events (e.g. one or more network events and one or more endpoint events) together.

The external reconnaissance message may be transmitted to a port associated with the public network address. Ports may be associated with network addresses at a transport layer of the network in question.

The event may be associated with an internal port.

The external reconnaissance data may be obtained by matching activity at the internal port to the external reconnaissance message. For example, the event may be matched to a reconnaissance-triggered network event which is associated with the internal port that was triggered by the external reconnaissance message.

The method may comprise a step of attempting to obtain the external reconnaissance data in response to determining that the event is associated with an internal port in a listening state.

The external reconnaissance data may indicate whether or not an internal port with which the event is associated has been determined to correspond to an external port in a listening state.

If the internal port has been determined to correspond to an external port in a listening state, the external reconnaissance data may comprise an identifier of the external port.

Alternatively or additionally, the external reconnaissance data may comprise other information obtained from external reconnaissance performed on the external port, such as content (e.g. web content) obtained by the external reconnaissance device from an entity (e.g. service) in the private network that is listening on the external port, or information about such content.

The external reconnaissance message may be transmitted as part of a port scan operation, the external reconnaissance data comprising results of the port scan operation.

As another example, the external reconnaissance device may connect to a particular port for the purpose of determining what software is listening on it and whether or not that software may be vulnerable to exploitation (e.g. because the version running is known to contain an unpatched bug allowing remote code exploitation). That is, the external reconnaissance message may be sent in an attempt to connect to a port associated with the public network address, so as to determine information about any software listening on that port.

An external reconnaissance message may be sent to an external port (a port associated with the public network address on the network interface) to determine a state of the port (referred to as a scan on that port). The results of a scan on a port may fall into one of the following categories:

The port is "open" or, equivalently, in a "listening state", implying an internal service is listening on the port, which in turn implies the service is reachable to an external client on the public network (e.g. it may mean that the service will accept incoming connections from external clients on that port). This is generally a result of port forwarding, as described later.

The port is "closed". Generally this means a reply was received indicating that incoming connections to the port are not accepted. Closed ports can also be a source of vulnerability, as a closed response implies a host within the private network was still reachable externally.

The port is "blocked", implying that a traffic regulation component associated with the network interface (such as a router or firewall) is blocking access to that port for external clients. This is generally the safest state for an external port, and in a typical deployment most (if not all) external ports are, or at least are intended to be, blocked.

The details of a port scan can vary significantly depending on the circumstances. In different circumstances, it will be possible to infer different information about the state of a port based on the existence or absence of a reply to the external reconnaissance message(s). The port scan can be performed over one or more transport protocols—TCP (Transmission Control Protocol) and/or UDP (User Datagram Protocol) in particular—and/or over one or more layers of the network (transport layer and/or application layer in particular). The result are not necessarily determinative (e.g. sometimes it might only be possible to determine that a port is in one of two of the above categories) but can still provide useful information in that event. Port scanning is known per se hence further details are not discussed herein.

Note that the determined state of a port may vary depending on the circumstances in which access is attempted. For example a firewall rule that only allows access to a particular port from certain IP addresses might cause, for example, the external reconnaissance device to see a closed port but other clients to see an open one (assuming the external reconnaissance device is attempting to connect from an IP address that is not whitelisted).

An aim of external reconnaissance is to determine to what extent, if any, internal services within the private network are accessible to external clients on the public network. As will be appreciated, in a client-server architecture, the fact that a port is blocked in the above sense does not necessarily mean all incoming traffic on that port is blocked. A client in the internal network may still be able to receive response traffic from an external server on a blocked port (in fact this is a common scenario). However, when a port is blocked, this should mean that external clients are not able to connect to internal servers on that port.

In a simple case, external reconnaissance may result in low level acceptance of a connection (e.g. TCP connection at the transport layer). In some cases, it may be possible to achieve application-layer connectivity, for example to a web service, which in turn allows more in-depth reconnaissance (e.g. a mapping out content provided by the service).

The reconnaissance message may be transmitted in response to receiving the event to be enriched. That is, the external reconnaissance may be driven by the incoming events.

Alternatively, the reconnaissance message may have been transmitted in advance in which case the resulting reconnaissance data may have been pre-stored in a reconnaissance database and the related public address may be used to retrieve the pre-stored external reconnaissance data associated with the related public network address in the reconnaissance database. That is, external reconnaissance may be performed in advance.

Alternatively a combination of event-driven and pre-performed reconnaissance may be used.

The enrichment based on external reconnaissance may comprise: extracting from the event a private network address within the private network, and determining the related public from the private network address, the related public address being a public address corresponding to the private network address.

This may be determined based on a mapping (association) between the public and private network addresses that is stored at the network interface.

The external reconnaissance may be based on at least one of: information about expected port forwarding settings, and one or more port forwarding assumptions.

The network interface may be a network interface of a network address translator.

Linking and enrichment can be performed in any number of stages, which may be performed in any order or in parallel. This can involve real-time enrichment, batch enrichment or a combination of both.

Another aspect of the invention provides a method of detecting security threats, the method comprising the following steps:
receiving, at an analysis engine, events pertaining to a monitored private network and analysing the events to detect security threat conditions indicated by the events;
wherein at least one of the events is analysed by the analysis engine based on external reconnaissance data associated with the at least one event, as determined by transmitting at least one reconnaissance message from an external reconnaissance device on a public network to an external port associated with a public network address on a network interface between the public and the private networks, wherein the external reconnaissance data is automatically associated with the at least one event by matching the external reconnaissance message with corresponding activity, as detected within the private network, relating to an internal port with which the at least one event is associated.

The matching may comprise matching a timestamp of the detected activity with a timing of the external reconnaissance message, The matching may comprise identifying the external reconnaissance device a source of the detected activity. This may be done by matching a network address, port and/or transport protocol of the external reconnaissance device with a source network address/port/transport protocol associated with the detected activity.

The detected activity may cause a reconnaissance-triggered network event to be created, which may be matched with the at least one event.

The external reconnaissance data may be associated with the event in an enrichment stage, in a joining stage (in which the event may be joined with the above external-reconnaissance event) or by the analysis engine in an analysis stage.

Reconnaissance-triggered network events may be joined or otherwise linked with other events (network or endpoint).

Another aspect of the invention provides a method of detecting security threats, the method comprising the following steps:
receiving, at a data processing system, events relating to a monitored network, the events comprising (i) network events generated by monitoring network traffic within the network, and (ii) endpoint events generated using endpoint agents executed on endpoints of the monitored network to monitor local activity at those endpoints, wherein each of the network and endpoint events comprises: (i) event description data, (ii) an associated timestamp, and (iii) one or more related entity identifiers; processing the network and endpoint events to link each of at least some of the endpoint events to at least one of the network events, based on the timestamps and the entity identifiers in those events;
analysing the events to detect security threat conditions indicated by the events, wherein at least one security threat condition is detected based on an endpoint event and a network event to which the endpoint event has been linked;
wherein the monitored network is a private network, and the method further comprises performing external reconnaissance by transmitting reconnaissance messages to one or more public network addresses on a public network, wherein the analysis is based on the events and the external reconnaissance.

This linking together of endpoint data with network data provides an extremely powerful basis for cyber security analysis. By linking such events together, it becomes possible to link inter-related endpoint and network activity for the purposes of analysis in a way that is not possible with the types of single point cyber defence solutions that are currently available.

The reconnaissance messages may be transmitted from an external reconnaissance device on the public network. The one or more public network addresses may be public network addresses on a network interface between the private network and the public network.

The at least one security threat condition may be detected based on external reconnaissance data as collected for a public network address related to at least one of: the endpoint event, and the network event to which it is linked.

In embodiments, of any of the above aspects at least some of the events may be linked by joining the events together, in a joining phase performed prior to the analysis.

The analysis may comprise creating, in an experience database, cases in response to the events, wherein at least some of the events are linked together by associating them with a common case.

The case may be populated with data of the events associated with it.

Each case may be assigned a threat score, the security threat conditions being detected based on the threat scores.

The method may comprise a step of standardizing the events according to a predetermined data model.

The one or more related entity identifiers may comprise one or more of: a network address, a user identifier, a device identifier, and an identifier of a process.

At least one of the endpoint events may be linked to at least one of the network events based on respective network connection identifiers in those events.

The event description data of the at least one endpoint event may associate at least one of the following with the network connection identifier: a socket on the endpoint, a host name of the endpoint, a process running on the endpoint, and a user account on the endpoint, which is thereby linked to the at least one network event.

The event description data of the endpoint event is thereby linked to the event description data of the network event, which may denote network activity associated with the identified network connection.

Each of those events may comprise multiple entity identifiers, which constitute the network connection identifier.

The multiple entity identity identifiers may be in the form of a five-tuple formed of: a source IP address, a source port, a destination IP address, a destination port and a transport protocol.

The method may comprise hashing the multiple entity identifiers in the events to create respective identifier hashes, wherein the events are linked based on the identifier hashes.

The network event may be a reconnaissance triggered network event (i.e. triggered by the at least one external reconnaissance message).

Another aspect of the invention provides a method of detecting security threats, the method comprising the following steps:
- receiving, at a data processing system, events relating to a monitored network, the events comprising network events generated by monitoring network traffic within the private network;
- performing external reconnaissance by transmitting reconnaissance messages to one or more public network addresses on a public network; and
- analysing the network events to detect security threat conditions indicated by the events, wherein at least one security threat condition is detected based on a reconnaissance-triggered network event, which has been matched to the external reconnaissance message.

In embodiments, the reconnaissance-triggered network event may be matched with the external recommissioned message based on at least one of a timestamp and an entity identifier in the reconnaissance-triggered network event.

Although the above focusses on performing reconnaissance against infrastructure within the private network (customer infrastructure), reconnaissance can also be performed against malicious infrastructure. For example, having observed suspicious activity relating to a particular domain name an appliance (processing component) may request that a microservice retrieve available content from this domain name and attempt to determine its purpose (to help substantiate a hypothesis that the activity is malicious).

Hence, in any of the above, an event may comprise or indicate a public network address, external reconnaissance data relevant to the event may be obtained by accessing the public network address (by transmitting at least one reconnaissance message thereto), and the event may be processed based on the relevant external reconnaissance data. For example, the event may relate to an attempt to access the public network address from within the private network. The public network address may be an address of a server on the public network. The event may be enriched with the relevant external reconnaissance data for analysis, or otherwise analysed based on the relevant external data.

As indicated above, in any of the above aspects of embodiments of the invention, the events in question may be compiled into "cases" for analysis, with the associated benefits set out above.

In a case-based approach, the method in question comprises:
- analysing the received events to identify at least one event that meets a case creation condition and, in response, creating a case in an experience database, the case being populated with data of the identified at least one event;
- assigning a threat score to the created case based on the event data;
- matching at least one further event to the created case and populating the case with data of the at least one further event, the threat score assigned to that case being updated in response; and
- in response to the threat score for one of the cases meeting a significance condition, rendering that case accessible via a case interface.

The event or the further event may be the event enriched or associated with the eternal reconnaissance data.

The above network event may be one of the event and the further event, and the above endpoint event may be the other of the event and the further event.

In such embodiments, the threat score meeting the significance condition constitutes a security threat condition in the above terminology. The above referred to security threat condition may be the threat score for said one of the cases meeting the significance condition.

Using this case-based analysis of relevant activity, cases can be built up over time in order to systematically collect and analyse information as threats develop. Cases that have been created from one or more observations may be given a low score initially because the confidence in the case relating to malicious activity is low. However, over time new observations may be added to a case. These may increase the confidence that the case relates to malicious activity.

In any of the above aspects or any embodiment thereof, the analysis may comprise creating, in an experience database, cases in response to the events, wherein at least some of the events are linked together by associating them with a common case.

The above endpoint event and the network event to which it is linked may be associated with the common case, and the security threat condition may be detected based on a threat score assigned the common case.

The above event enriched or associated with the external reconnaissance data may be associated with the common case, thereby linking it with at least one other event which is also associated with the common case, and the security threat condition is detected based on a threat score assigned to the common case.

Each case may be populated with data of the event or events associated with it.

The common case may be rendered accessible via a case user interface, in response to the threat score for one of the cases meeting a significance condition, rendering that case accessible via a case interface.

Each case may be assigned a threat score, and the security threat condition is detected based on the threat score associated with the common case.

In any of the above aspects or embodiments thereof, the method may comprise:
- analysing the received events to identify at least one event that meets a case creation condition and, in response, creating a case in an experience database, the case being populated with data of the identified at least one event;
- assigning a threat score to the created case based on the event data;
- matching at least one further event to the created case and populating the case with data of the at least one further event, the threat score assigned to that case being updated in response; and
- in response to the threat score for one of the cases meeting a significance condition, rendering that case accessible via a case interface.

One of the event and the further event may be the above event enriched or associated with the external reconnaissance data is, wherein the threat score for that case meeting the significance condition constitutes a security threat condition.

One of the event and the further event may be the above network event, and the other of the event and the further network event may be the above endpoint event.

In embodiments, the further event may be matched to the case based on respective timestamps of the further event and the case.

The further event may be matched to the case based on respective entity identifiers of the further event and the case.

Each of the entity identifiers may be: a user identifier, a device identifier, a network address, or an identifier of a process.

The events may comprise: (i) network events generated by monitoring network traffic within the network, and (ii) endpoint events generated using endpoint agents executed on endpoints of the network to monitor local activity at those endpoints.

The events may comprise joined events created by joining together network events and endpoint events.

The threat score for the case may be repeatedly updated as further events are received and matched to the case.

The at least one further event may comprise a subsequent event.

The at least one further event may comprise an earlier event.

The analysis may comprise matching the at least one event to a tactic associated with a known attack technique and creating the case in response.

The at least one further event may be matched to the case by matching the at least one further event to the same tactic.

The at least one further event may be matched to the case by matching the at least one further event to another tactic associated with the known attack technique.

The at least one further event may be matched to the case by matching the at least one further event to another attack technique associated with the known attack technique.

Information about a set of multiple cases may be rendered available via the case user interface in response to a determination that those cases (i) comprise matching entity identifiers, and (ii) meet a collective significance condition.

An enrichment process may be applied to the events, to augment the events with enrichment data prior to the analysis.

The enrichment may be performed in real-time.

The events may be stored in an observation database.

An enrichment process may be applied to the events in the observation database, to augment the events with enrichment data.

The enrichment process may be a batch enrichment process performed according to an enrichment schedule.

The analysis may be applied to a combination of events received from an event queue and events received from the observation database.

A first stage enrichment process may be applied to the events received from the event queue and a second stage enrichment process is applied to the events stored in the observation database.

At least one further event may be accessed from the observation database and matched to the case, wherein that further event is located by searching for events within a threat time window.

The length of the threat time window may be determined based on a type of attack associated with the case.

Another problem addressed by this disclosure is that, in current cybersecurity systems, intelligence known about threat types and threat actors is often predicated on assumptions made about infrastructure being targeted. However, this disclosure recognized that threats often manifest themselves on both a network and one or more of its endpoints. Another aspect of the invention provides a system that uses data from both endpoint systems and networks as a basis for cybersecurity analysis, for example to compile and score cases. This may be combined with other information such threat intelligence.

The method may comprise controlling a display to render a case interface page, wherein each of the events comprises a timestamp and identifier of a related entity; and causing the display to render (i) a timeline of the events and (ii) a visual representation of the related entities identified in the events, wherein each of the events on the timeline is selectable, wherein selection of that event causes the visual representation to be modified so as to focus on one or more of the entities related to the selected event.

In embodiments, the entities may comprise network infrastructure components wherein the graphical representation is in the form of a network infrastructure map.

The set of events may be comprised in a case, having an associated threat score, which is displayed on the case interface page.

The case interface page may be rendered available in response to the threat score meeting a significance condition.

Another aspect of the invention provides a system for detecting security threats comprising an input configured to receive events and one or more processors configured to execute instructions, which cause the one or more processors to implement any of the methods or functions disclosed herein.

Another aspect of the invention provides a computer program comprising instructions stored on a computer-readable storage medium and configured, when executed on one or more processors, to implement any of the methods or functions disclosed herein.

BRIEF DESCRIPTION OF FIGURES

For a better understanding of the present invention, and to show how embodiments of the same may be carried into effect, reference is made to the following Figures in which:

FIG. 5 shows an example layout of a case user interface;

DETAILED DESCRIPTION

Figure 1:
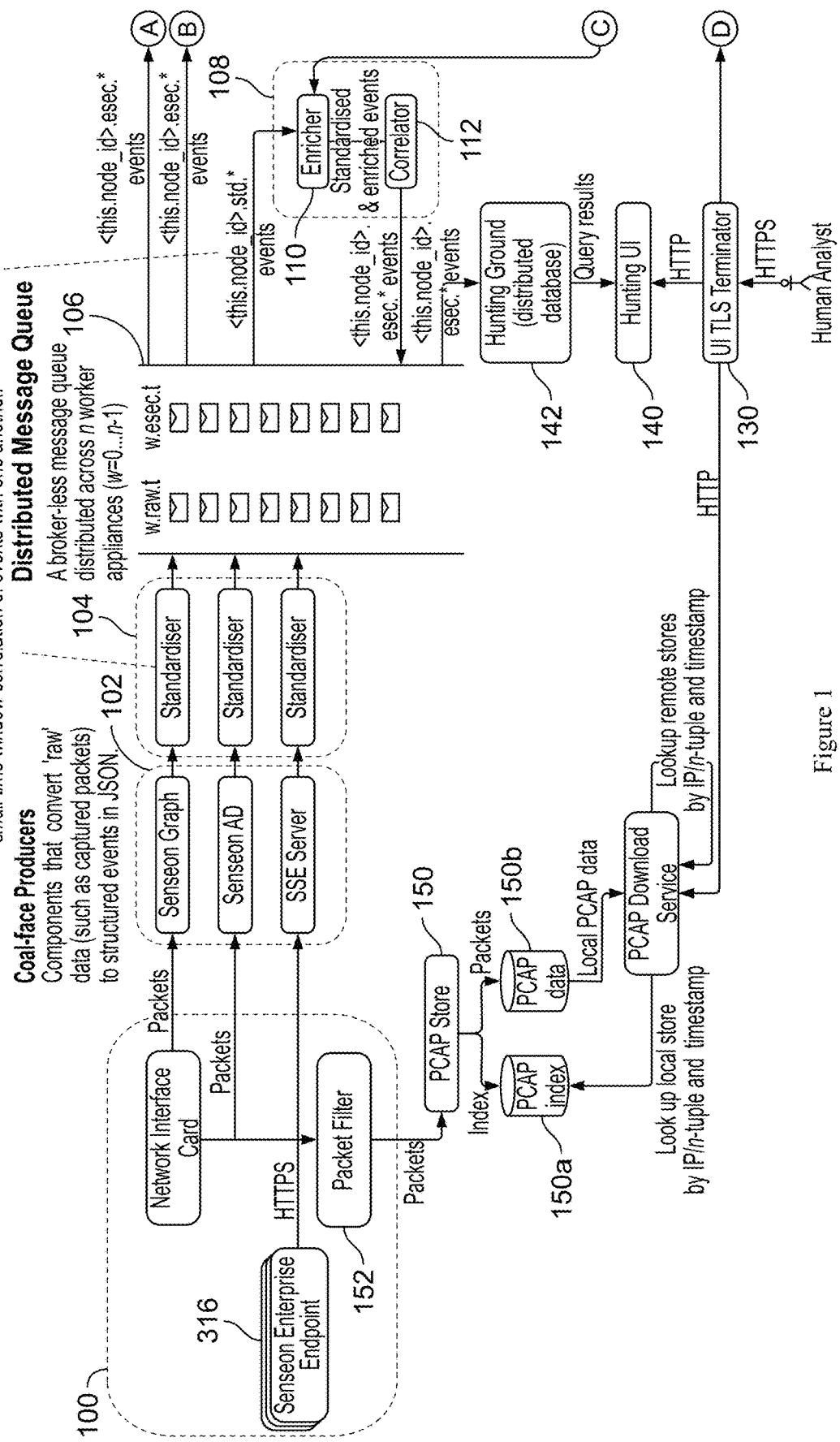
FIG. 1 shows a schematic function block diagram of a cyber defence platform.
Figure 1:
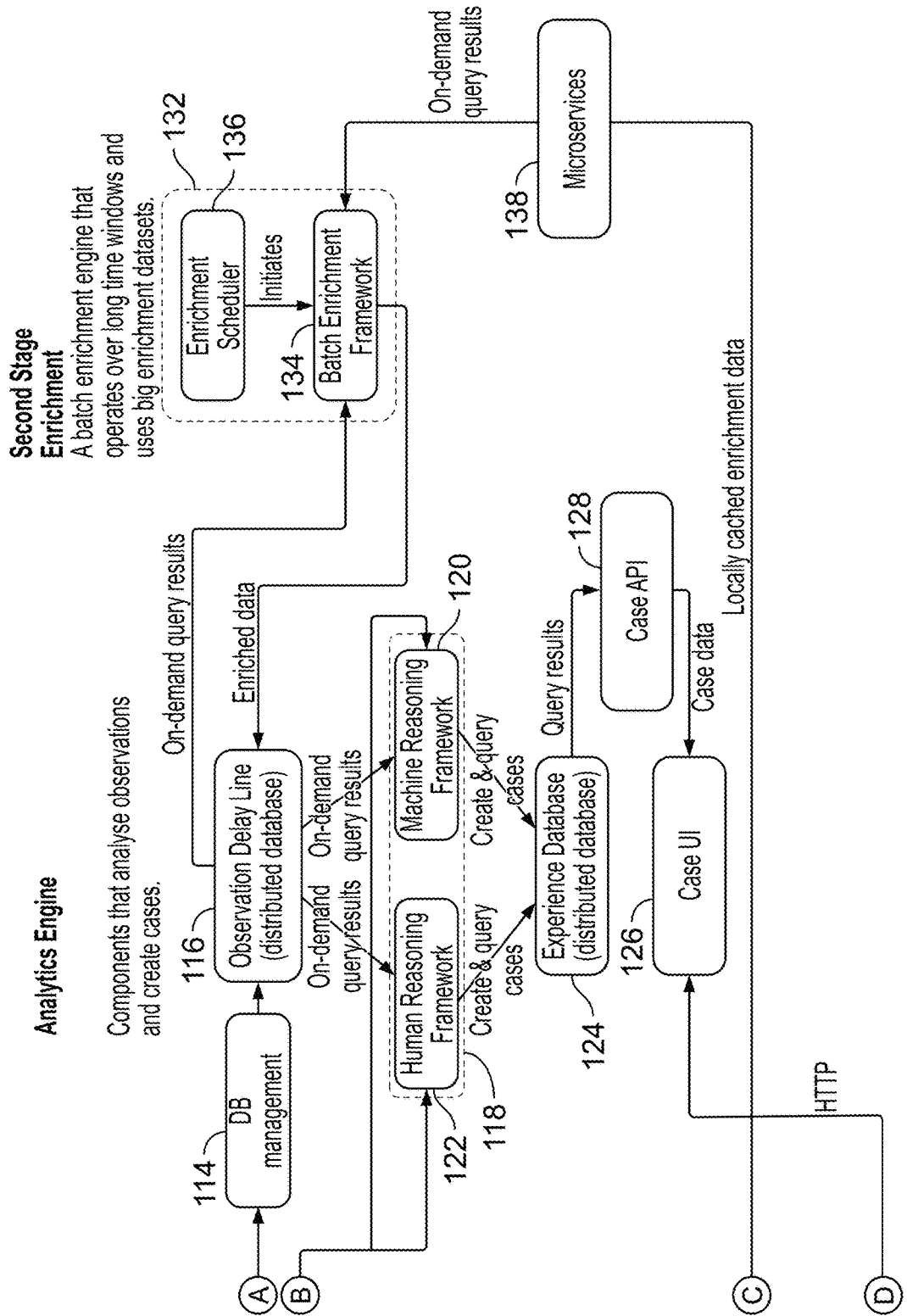

Network reconnaissance and/or vulnerability scanning may be performed for the purpose of testing a network for potential vulnerabilities (regarding terminology, network scanning does not link directly to vulnerabilities, whereas vulnerability scanning does). External reconnaissance of a private network means that the testing is based on scanning that is performed externally to the network, to test for vulnerabilities on the public side of the network. This is beneficial as certain activity or properties of a network may be difficult or impossible to determine exclusively within the network itself.

A network may be private in that, whilst it has connectivity to a public network (such as the Internet), access between those networks is regulated as a security measure. Typically, the private network is connected to the public network via a router, which has a traffic regulation component(s), such as a firewall, which functions to regulate access to the public network from the private network and vice versa. This can involve, for example, blocking incoming packets from unknown sources on the public network or blocking the use of certain ports, as well as more advanced traffic analysis to detect and block suspicious traffic between the public and private networks (in either direction).

This can be applied in conjunction with network address translation performed at the router, in which case the router operates as a network address translator (NAT). Network address translation creates a private address space within the private network, which is used as a basis for communication between endpoints and processes within the private network (that is, based on private addresses assigned to them within the private address space). However, addresses within the private address space are not directly addressable on the public network. Outgoing packets arriving at the NAT from within the private network have source addresses within the private address space. These are mapped at the NAT to corresponding addresses within a public address space of the public network (i.e., public addresses on the public side of the NAT), and before leaving the network the private address data is replaced with the corresponding public address data. Similarly, incoming packets arriving at the NAT are addressed to public addresses on the public side of the NAT, and hence arrive at the NAT. The public source address data in those packets are replaced with the corresponding private address data before the packets enter the private network. "Address" in this context usually refers to transport address, which is a combination of IP address with port number, and hence is generally process-specific (an IP address and port generally corresponds to a specific process on a specific endpoint).

A mapping between a private source transport address and a corresponding public transport address on the NAT may be created when an internal client first sends a message from that private address to that public address. This could for example be an outgoing connection request sent by an internal client in an attempt to establish a connection with an external service on the public network.

Regarding terminology, it is noted that the term "service" is used in a broad sense and can mean both a system that accepts incoming connections (a server) and an application running on such a system. It will be clear in context what is being referred to.

An application within the private network may also start "listening" on a port, i.e. start to accept incoming requests from clients on the port. In this context, the application operates as service. This may be referred to as "opening" a port. Opening a port on the private network does not necessarily result in one being opened on the NAT device's public interface. In the absence of a corresponding external listening port, the service will only be accessible internally to clients within the private network. However, a NAT device can be configured (normally manually but there are ways to do it automatically) to forward ports from its public interface to an internal device (IP, port) couple. In this way, an internal device on the private side of the router can accept incoming connections from the public side of the router. One aspect of external reconnaissance is monitoring any open ports on the public side of the network interface, as an open port is a potential source of vulnerability. If a public port is open on the NAT, this implies the NAT is applying port forwarding to forward incoming connections/other messages arriving at that open public port to an internal port in on which an internal service is listening.

In the case that network address translation is used, when an event to be enriched is associated with an internal port in a listening state, a determination is made as to whether or not that internal port corresponds to any external port in a listening state (which would generally be as a result of port forwarding being performed to that internal port from an external port). This may be necessary to allow external reconnaissance to be performed in response to the event and/or to locate the results of earlier related external reconnaissance; or, more generally, to link a piece(s) of external reconnaissance to that particular event. Examples of this are described below.

With reference to FIGS. 1-5E, a context in which embodiments of the invention may be implemented will now be describe described.

A cyber defence platform (system) is described that links together network and endpoint events, and compiles those events into cases, for the purposes of cyber defence analysis. As described later, the present invention can be implemented within the cyber defence platform thereof and/or in combination with certain features disclosed therein. However, the invention is not limited in this respect and can be implemented independently and in other contexts.

As indicated, in embodiments, the external reconnaissance-based enrichment of this disclose can be implemented within the cyber defence platform, so as to use data from endpoint systems, networks, external reconnaissance of customer infrastructure and threat intelligence to compile and score cases.

In the cyber defence platform, automated threat detection is performed based on "cases" by an analysis engine. Observations (events) are grouped together into cases by an analysis engine. This is achieved by associating events that are related by some common feature or group of features, e.g. time, device involved, user involved etc. and scoring the case as a whole according to how likely its constituent observations and their relationships are to correspond to malicious activity. The events themselves comprise a combination of (i) network events generated by monitoring network traffic within the network, and (ii) endpoint events generated using endpoint agents executed on endpoints of the monitored network to monitor local activity at those endpoints. Network and endpoint events are linked together based on timestamps and entity identifiers therein.

When further combined with external reconnaissance, this can provide powerful insights into potentially suspicious activity. For example, if external reconnaissance determines that a port(s) on the public side of the router has been opened-up (perhaps unexpectedly), and that activity on the public side of the network can be linked backed to suspicious activity within the network (via network event(s)) and on an endpoint(s) of the network (via linked endpoint event(s)), that information as a whole is highly relevant in the context of a cyber defence analysis.

Many of the current cyber defence technologies are "single point solutions", each of which operates with a narrow focus on a specific cyber defence task. As a consequence, many critical systems are currently protected by a multitude of single point solutions that operate independently and disjointedly. This lack of coordination results in "blind spots" which attackers are able to exploit by bypassing the single point solutions individually. Over the years, attackers have developed numerous methods for bypassing single point cyber defence solutions, which makes these blind spots a significant source of vulnerability.

Another problem with existing cyber defence technologies is one of over-reporting. That is, where an excessive volume of alerts or warnings may be triggered by network activity which appears suspect according to a certain set of applied criteria, but which often turns out to be legitimate. This problem is exacerbated by the use of multiple single point solutions, and grows as the number of single point solutions in use grows. Moreover, where different solutions use different reporting systems, as is common, their outputs as a whole are even harder to manage and interpret meaningfully.

An integrated cyber defence platform is disclosed herein, which provides overarching protection for a network against cyberattacks, through a combination of comprehensive network and endpoint data collection and organization, and advanced analytics applied to the resulting output. The platform operates according to an "observation-hypothesis-action" model, as will now be described. This may also be referred to herein as triangulation.

A key feature of the platform it its ability to collect and link together different types of event, and in particular (i) network events and (ii) endpoint events. This occurs at various places within the system, as described below.

Network events are generated by collecting raw network data from components (sub-systems, devices, software components etc.) across a monitored network, and re-structuring the raw network data into network events. The raw network data can for example be obtained through appropriate network tapping, to provide a comprehensive overview of activity across the network.

Endpoint events are generated using dedicated endpoint monitoring software in the form of endpoint agents that are installed on endpoints of the network being monitored. Each endpoint agent monitors local activity at the endpoint on which it is installed, and feeds the resulting data (endpoint data) into the platform for analysis.

This combination of endpoint data with network data is an extremely powerful basis for cyber defence.

In a data optimization stage, observations are captured in the form of structured, timestamped events. Both network events and endpoint events are collected at this stage and enhanced for subsequent analysis. Events generated across different data collectors are standardized, as needed, according to a predefined data model. As part of the data optimization, first stage enrichment and joining is performed. This can, to some extent at least, be performed in real-time or near-real time (processing time of around 1 second or less). That is, network and endpoint events are also enriched with additional relevant data where appropriate (enrichment data) and selectively joined (or otherwise linked together) based on short-term temporal correlations. Augmentation and joining are examples of what is referred to herein as event enhancement.

In an analytics stage, these enhanced network events are subject to sophisticated real-time analytics, by an analysis engine. This includes the use of statistical analysis techniques commonly known as "machine learning" (ML). The analysis is hypothesis-based, wherein the likelihood of different threat hypotheses being true is assessed given a set of current or historic observations.

One component of this analysis is the consideration of longer-term temporal correlations between events, and in particular different types of event such as network and endpoint event. Events that appear to be related are grouped into "cases" over time, as they arrive at the analysis engine. A case corresponds to one or more threat hypotheses. Each case has at least one assigned threat score, denoting the threat level indicated by its constituent events.

The creation and subsequent population of cases is driven by the results of analysing incoming events. A case is created for at least one defined threat hypothesis in response to an event that is classed as potentially malicious, and populated with data of that event. That is, each case is created in response to a single event received at the analysis engine. It is noted however that the event that causes a case to be created can be a joined event, which was itself created by joining two or more separate events together, an enriched event, or both.

Once a case has been created, it may be populated with data of subsequently received events that are identified as related to the case in question (which again may be joined and/or augmented events) in order to provide a timeline of events that underpin the case.

A case may alternatively or additionally be populated with data of one or more earlier events (i.e. earlier than the event or events that triggered its creation). This is appropriate, for example, where the earlier event(s) is not significant enough in itself to warrant opening a case (e.g. because it is too common), but whose potential significance becomes apparent in the context of the event(s) that triggered the creation of the case.

An event itself does not automatically create a case. An event may be subject to analysis (which may take into account other data-such as other events and/or external datasets) and it is the result of this analysis which will dictate if it will culminate in the creation of a new case or update of an existing case. A case can be created in response to one event which meets a case creation condition, or multiple events which collectively meet a case creation condition.

The criteria according to which cases are created and subsequently populated based on incoming events can be formulated around the "Mitre ATT&CK framework" or any other structured source of attack knowledge, as described later.

Generally, the threat score for a newly-created case will be low, and it is expected that a large number of cases will be created whose threat scores never become significant (because the events driving those cases turn out to be innocuous). However, in response to a threat occurring within the network being monitored, the threat score for at least one of the cases is expected to increase as the threat develops.

Another key feature of the system is the fact that cases are only rendered available via a case user interface (UI) when their threat scores reach a significance threshold, or meet some other significance condition. In other words, although a large number of cases may be created in the background, cases are only selectively escalated to an analyst, via the case UI, when they become significant according to defined significance criteria.

Case escalation is the primary driver for actions taken in response to threats or potential threats.

The cyber defence platform is implemented as a set of computer programs that perform the data processing stages disclosed herein. The computer programs are executed on one or more processors of a data processing system, such as CPUs, GPUs etc.

FIG. 1 shows a schematic block diagram of the cyber defence platform, which is a system that operates to monitor traffic flowing through a network as well as the activity at and the state of endpoints of that network in order to detect and report security threats. The system is shown to comprise a plurality of data collectors 102 which are also referred to herein as "coal-face producers". The role of these components 102 is to collect network and endpoint data and, where necessary, process that data into a form suitable for cyber security, analysis. One aspect of this is the collection of raw network data from components of the network being monitored and convert that raw data into structured events (network events), as described above. The raw network data is collected based on network tapping, for example.

Event standardisation components 104 are also shown, each of which receives the events outputted from a respective one of the coal-face producers 102. The standardisation components 104 standardise these structured events according to a predefined data model, to create standardized network and endpoint events.

The raw network data that is collected by the coal-face producers 102 is collected from a variety of different network components 100. The raw network data can for example include captured data packets as transmitted and received between components of the network, as well as externally incoming and outgoing packets arriving at and leaving the network respectively.

Additionally, structured endpoint events are collected using endpoint agents 316 executed on endpoints throughout the network. The endpoint agents provide structured endpoint events to the coal-face producers 102 and those events are subject to standardization, enrichment and correlation as above.

This is described in further detail below, with reference to FIG. 3.

Once standardised, the network events are stored in a message queue 106 (event queue), along with the endpoint events. For a large-scale system, the message queue can for example be a distributed message queue. That is, a message queue 106 embodied as a distributed data storage system comprising a cluster of data storage nodes (not shown in FIG. 1).

An event optimisation system 108 is shown having an input for receiving events from the message queue 106, which it processes in real-time or near real-time to provide enhanced events in the manner described below. In FIG. 1, enhanced events are denoted w.esec.t, as distinct from the "raw" events (pre-enhancement) which are denoted w.raw.t. Raw events that are stored in the message queue 106 are shown down the left hand side of the message queue (these are the standardised, structured events provided by the standardisation components 104) whereas enhanced events are shown on the right hand side. However, it will be appreciated that this is purely schematic and that the events can be stored and managed within the message queue 106 in any suitable manner.

The event enhancement system 108 is shown to comprise an enrichment component 110 and a joining component 112. The enrichment component 106 operates to augment events from the message queue 106 with enrichment data, in a first stage enrichment. The enrichment data is data that is relevant to the event and has potential significance in a cyber-security context. It could for example flag a file name or IP address contained in the event that is known to be malicious from a security dataset. The enrichment data can be obtained from a variety of enrichment data sources including earlier events and external information. The enrichment data used to enrich an event is stored within the event, which in turn is subsequently returned to the message queue 106 as described below. In this first stage enrichment, the enrichment data that is obtained is limited to data that it is practical to obtain in (near) real-time. Additional batch enrichment is performed later, without this limitation, as described below.

The joining component 112 operates to identify short-term, i.e. small time window, correlations between events. This makes use of the timestamps in the events and also other data such as information about entities (devices, processes, users etc.) to which the events relate. The joining component 112 joins together events that it identifies as correlated with each other (i.e. interrelated) on the timescale considered and the resulting joined user events are returned to the message queue 106. This can include joining together one or more network events with one or more endpoint events where appropriate.

In FIG. 1, the joining component 112 is shown having an output to receive enriched events from the enrichment component 110 such that it operates to join events, as appropriate, after enrichment. This means that the joining component 112 is able to use any relevant enrichment data in the enriched events for the purposes of identifying short-term correlations. However, it will be appreciated that in some contexts at least it may be possible to perform enrichment and correlation in any order or in parallel.

An observation database manager 114 (storage component) is shown having an input connected to receive events from the message queue 106. The observation database manager 114 retrieves events, and in particular enhanced (i.e. enriched and, where appropriate, joined) events from the message queue 106 and stores them in an observation delay line 116 (observation database). The observation delay line 116 may be a distributed database. The observation delay line 116 stores events on a longer time scale than events are stored in the message queue 106.

A batch enrichment engine 132 performs additional enrichment of the events in the observation delay line 116 over relatively long time windows and using large enrichment data sets. A batch enrichment framework 134 performs a batch enrichment process, in which events in the observation delay line 116 are further enriched. The timing of the batch enrichment process is driven by an enrichment scheduler 136 which determines a schedule for the batch enrichment process. Note that this batch enrichment is a second stage enrichment, separate from the first stage enrichment that is performed before events are stored in the observation delay line 116.

Figure 3:
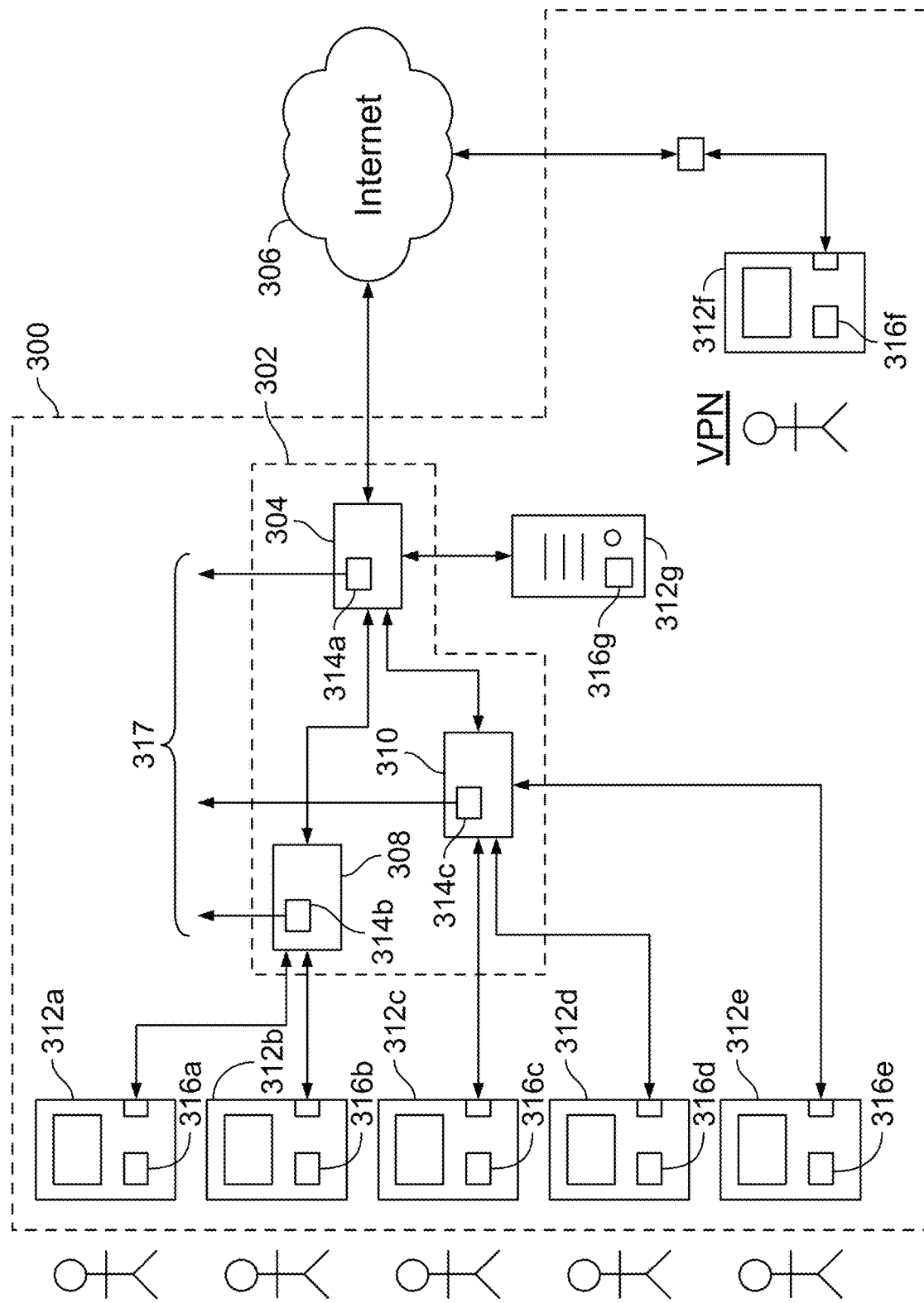
FIG. 3 shows a schematic block diagram of a network which may be subject to a cyber-security analysis.

Network and Endpoint Events:

FIG. 3 shows a schematic block diagram of an example network 300 which is subject to monitoring, and which is a private network. The private network 300 is shown to comprise network infrastructure, which can be formed of various network infrastructure components such as routers, switches, hubs etc. In this example, a router 304 is shown via which a connection to a public network 306 is provided such as the Internet, e.g. via a modem (not shown). This provides an entry and exit point into and out of the private network 300, via which network traffic can flow into the private network 300 from the public network 306 and vice versa. Two additional network infrastructure component 308, 310 are shown in this example, which are internal in that they only have connections to the public network 306 via the router 304. However, as will be appreciated, this is purely an example, and, in general, network infrastructure can be formed of any number of components having any suitable topology.

In addition, a plurality of endpoint devices 312a-312f are shown, which are endpoints of the private network 300. Five of these endpoints 312a-312e are local endpoints shown directly connected to the network infrastructure 302, whereas endpoint 312f is a remote endpoint that connects remotely to the network infrastructure 302 via the public network 306, using a VPN (virtual private network) connection or the like. It is noted in this respect that the term endpoint in relation to a private network includes both local endpoints and remote endpoints that are permitted access to the private network substantially as if they were a local endpoint. The endpoints 312a-312f are user devices operated by users (client endpoints), but in addition one or more server endpoints can also be provided. By way of example, a server 312g is shown connected to the network infrastructure 302, which can provide any desired service or services within private network 300. Although only one server is shown, any number of server endpoints can be provided in any desired configuration.

For the purposes of collecting raw network data, a plurality of network data capture component 314a-314c are provided. These can for example be network taps. A tap is a component which provides access to traffic flowing through the network 300 transparently, i.e. without disrupting the flow of network traffic. Taps are non-obtrusive and generally non-detectable. A tap can be provided in the form of a dedicated hardware tap, for example, which is coupled to one or more network infrastructure components to provide access to the raw network data flowing through it. In this example, the taps 314a, 314b and 314c are shown coupled to the network infrastructure component 304, 308 and 310 respectively, such that they are able to provide, in combination, copies 317 of any of the raw network data flowing through the network infrastructure 302 for the purposes of monitoring. It is this raw network data that is processed into structured network events for the purpose of analysis.

Figure 2:
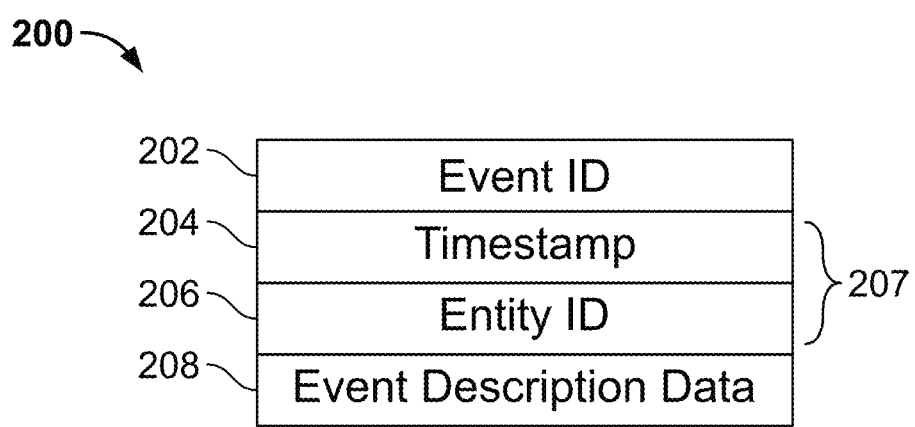
FIG. 2 shows a highly schematic representation of a network event.

FIG. 2 shows a schematic illustration of certain high level structure of a network event 200.

The network event 200 is shown to comprise a timestamp 204, an entity ID 206 and network event description data (network event details) 208. The timestamp 204 and entity ID 206 constitute metadata 207 for the network event details 208.

The network event description data 208 provides a network event description. That is, details of the activity recorded by the network event that has occurred within the network being monitored. This activity could for example be the movement of a network packet or sequence of network packets through infrastructure of the network, at a particular location or at multiple locations within the network.

The network event data 208 can for example comprise one or more network event type indicators identifying the type of activity that has occurred. The entity ID 206 is an identifier of an entity involved in the activity, such as a device, user, process etc. Where multiple entities are involved, the network event can comprise multiple network event IDs. Two important forms of entity ID are device ID (e.g. MAC address) and network address (e.g. IP address, transport address (IP address plus port) etc.), both of which may be included in a network event.

As well as being used as part of the analysis (in conjunction with the timestamps 204), entity IDs 206 and network event description data 208 can be used as a basis for querying enrichment data sources for enrichment data.

The timestamp 204 denotes a timing of the activity by the network event 200. Such timestamps are used as a basis for associating different but related network events, together with other information in the network event 200 such as the entity ID 206 or IDs it contains.

The network event 200 can have structured fields in which this information is contained, such as a timestamp field, one or more entity ID fields and one more network event description fields.

The network event 200 is shown to comprise a network event identifier (ID) 202 which uniquely identifies the network event 200.

Returning to FIG. 3, for the purpose of collecting endpoint data, endpoint monitoring software (code) is provided which is executed on the endpoints of the network 300 to monitor local activity at those endpoints. This is shown in the form of endpoint agents 316a-316g (corresponding to endpoint agents 316 in FIG. 1) that are executed on the endpoints 312a-312g respectively. This is representative of the fact that endpoint monitoring software can be executed on any type of endpoint, including local, remote and/or server endpoints as appropriate. This monitoring by the endpoint agents is the underlying mechanism by which endpoint events are collected within the network 300.

Figure 4:
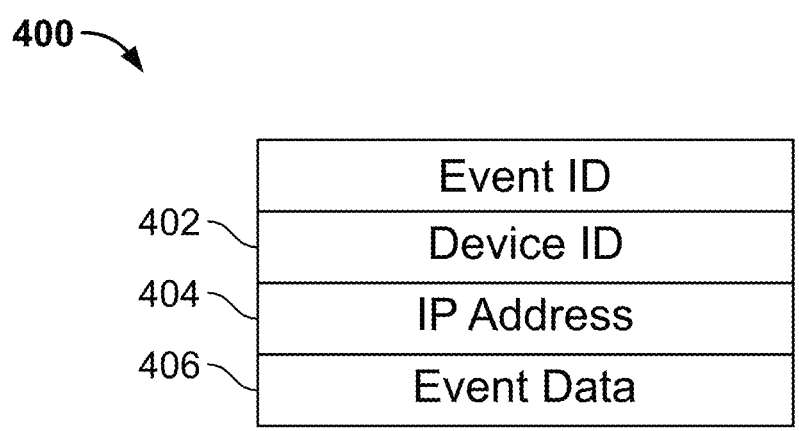
FIG. 4 shows a highly schematic representation of an endpoint event.
Figure 5A:
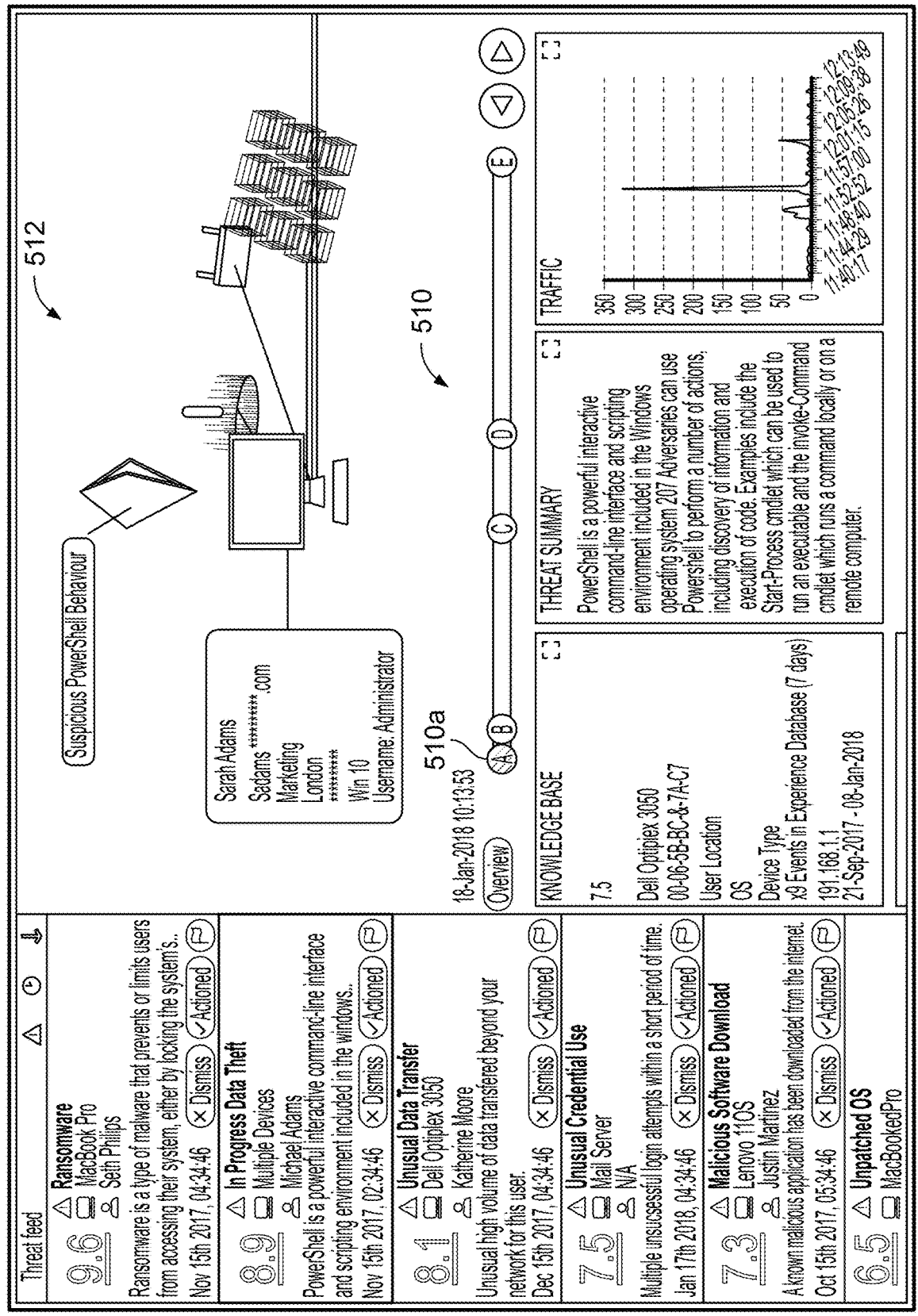
FIGS. 5a to 5e shows a case user interface dynamically responding to a series of user inputs.
Figure 5B:
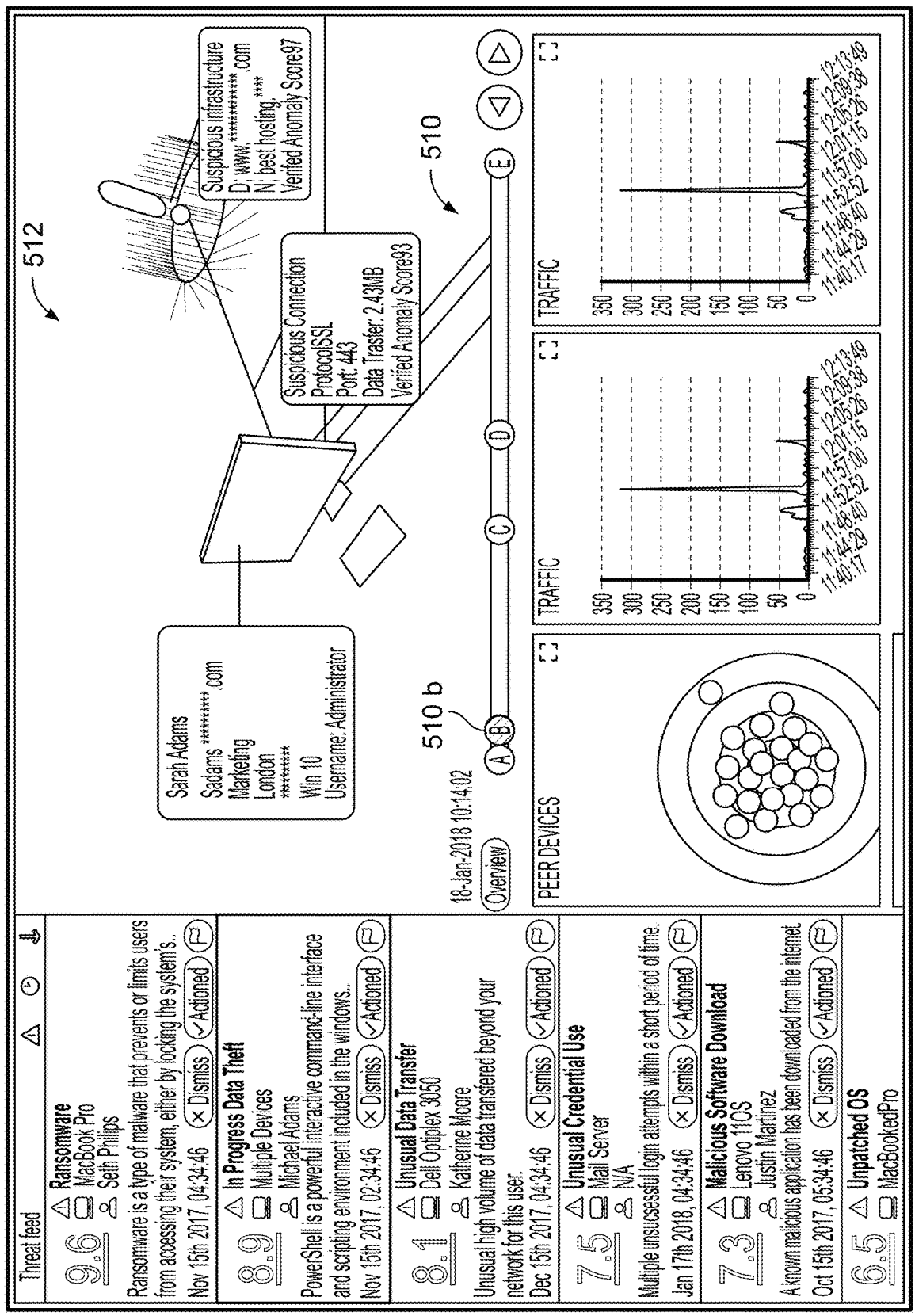
Figure 5C:
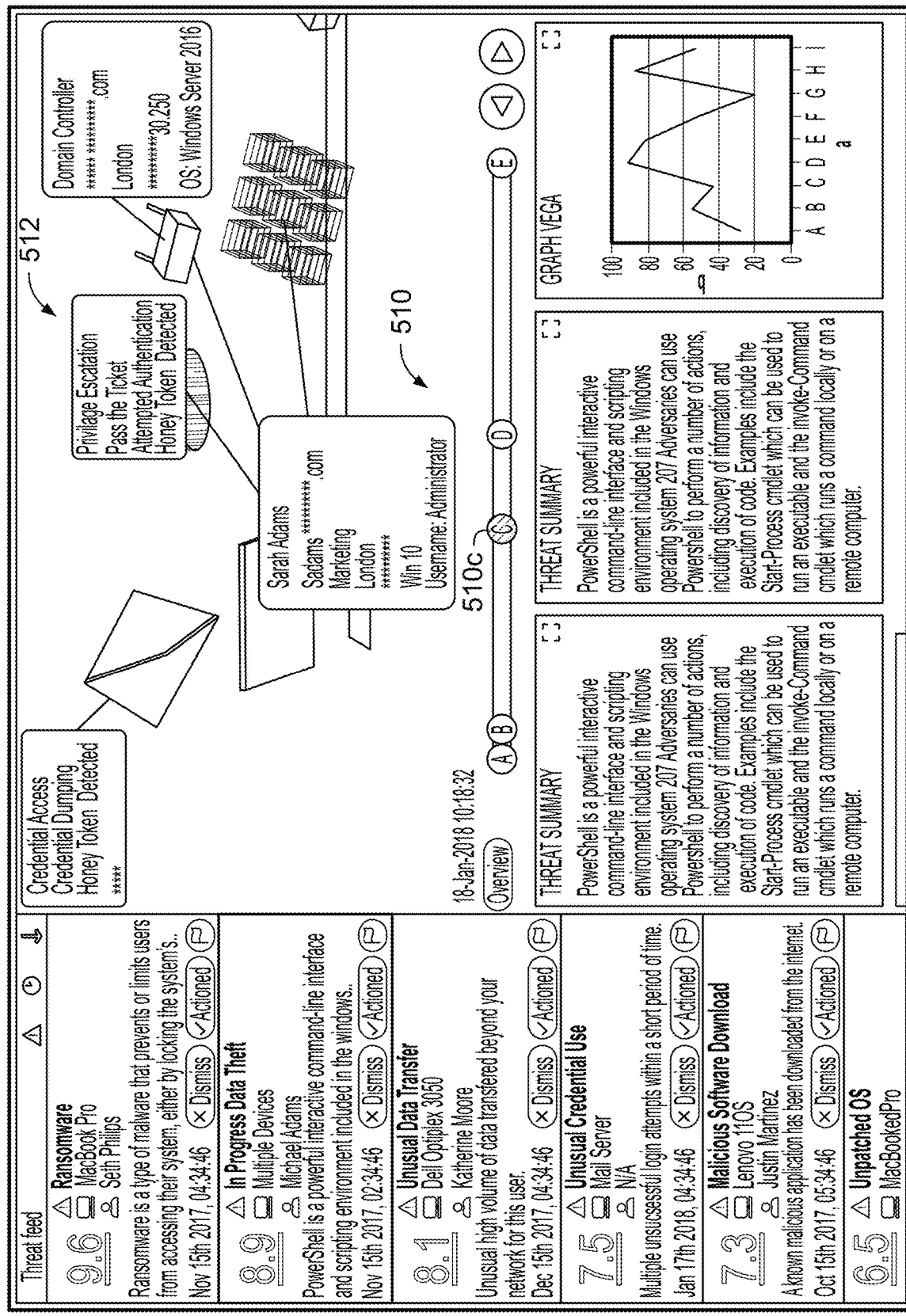
Figure 5D:
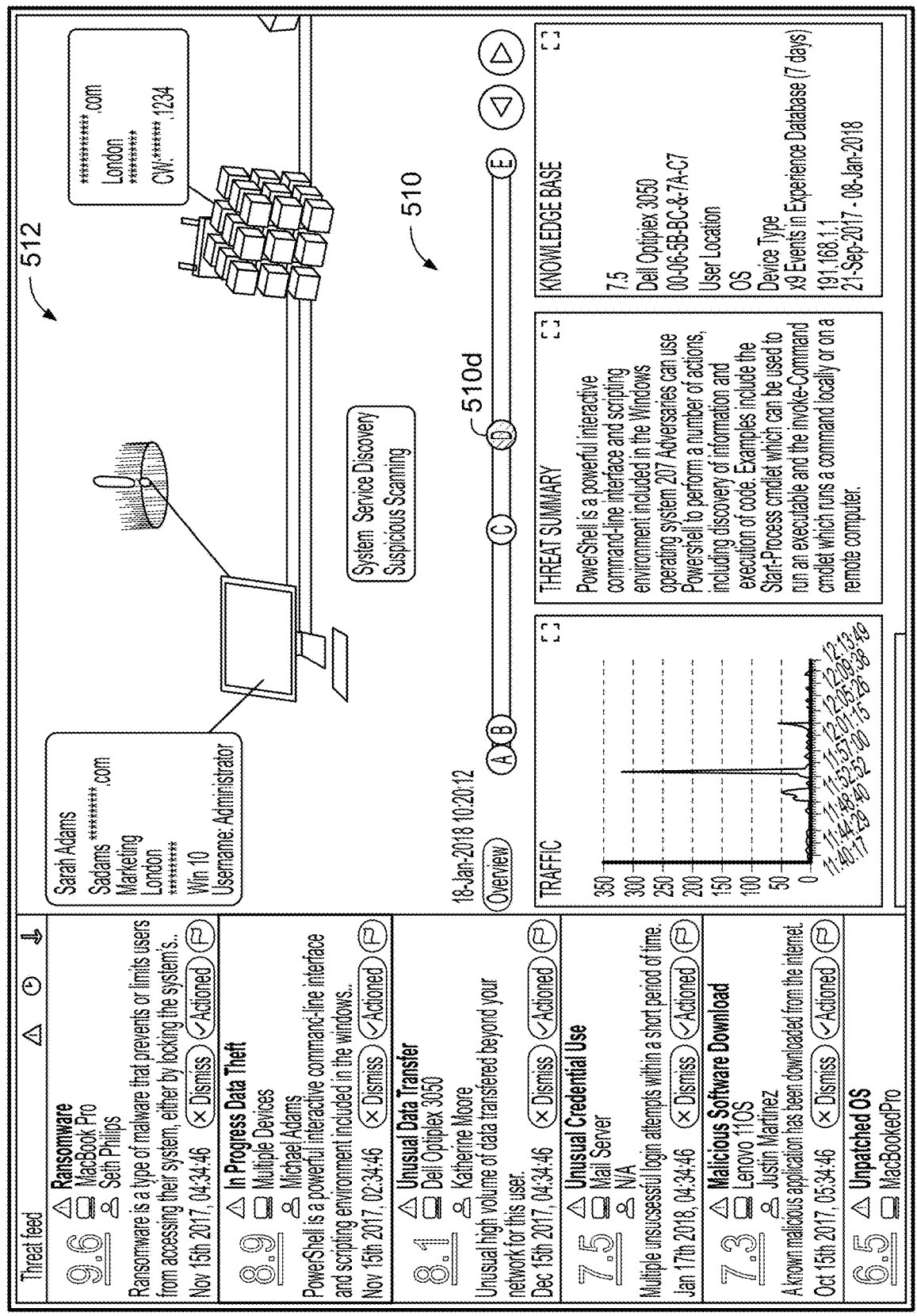
Figure 5E:
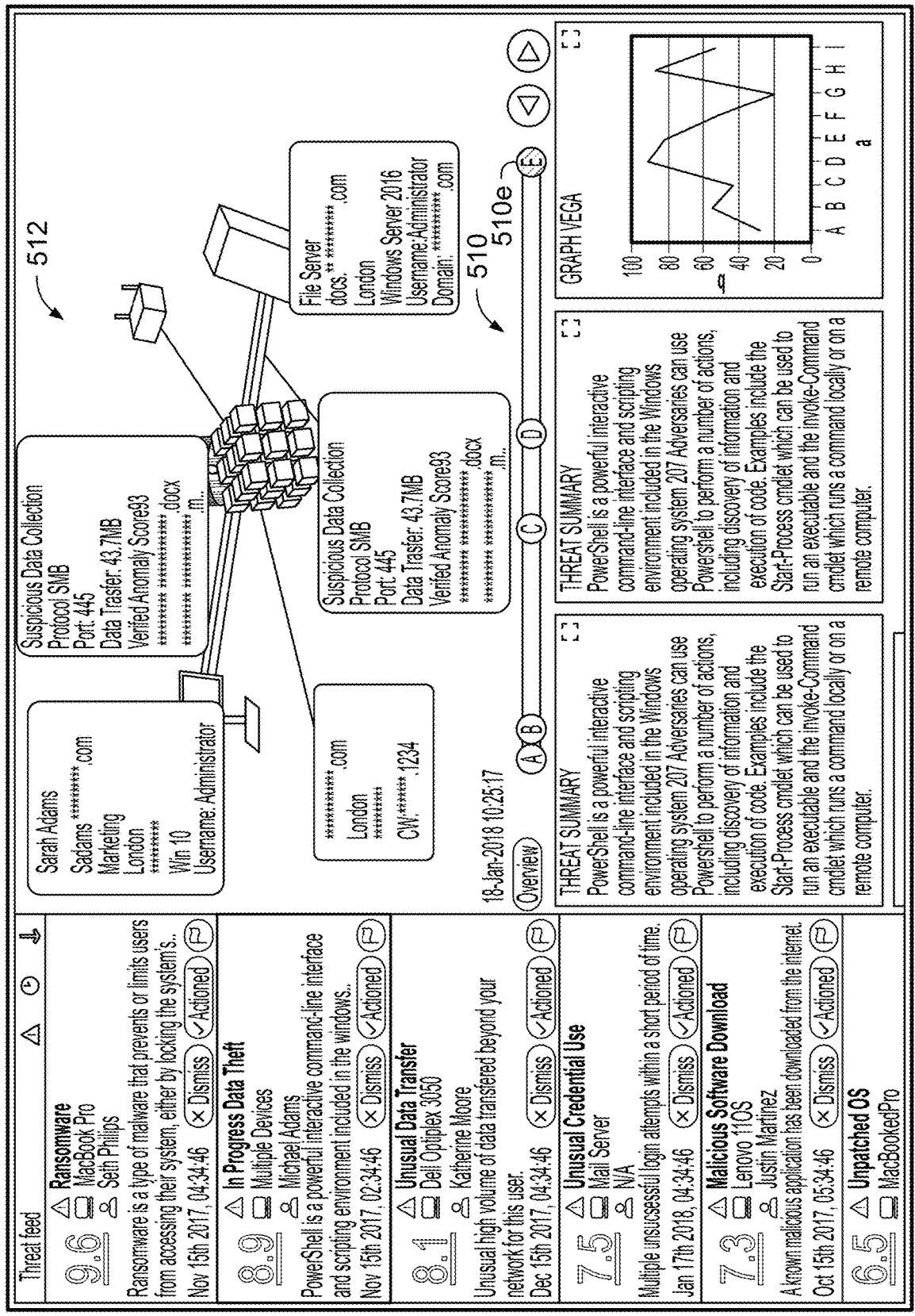

FIG. 4 shows a schematic illustration of a certain high level structure of an endpoint event 400.

The endpoint event 400 is shown to comprise at least one endpoint identifier, such as a device identifier (e.g. MAC address) 402 and network (e.g. IP) address 404 of the endpoint to which it relates, and endpoint event description data 406 that provides details of the local activity at the endpoint in question that triggered the creation of the endpoint event 400.

One example of endpoint activity that may be valuable from a cyber defence perspective is the opening of a connection at an endpoint. For example, a TCP/IP connection is uniquely defined by a five-tuple of parameters: source IP address (IP address of the endpoint being monitored), source port, destination IP address (IP address of an e.g. external endpoint to which the connection is being opened), destination port, and protocol. A useful endpoint event may be generated and provided to the platform for analysis when an endpoint opens a connection, in which the five-tuple defining the connection is recorded, and well as, for example, an indication of a process (application, task, etc.) executed on the endpoint that opened the connection.

As noted, one of the key features of the present cyber defence platform is its ability to link together interrelated network and endpoint events. Following the above example, by linking and endpoint event recording the opening of a connection and details of the process that opened it to network events recording the flow of traffic along that connection, it becomes possible to link specific flows of network traffic to that specific process on that endpoint.

Additional examples of endpoint information that can be captured in endpoint events include information about processes running on the endpoint (a process is, broadly, a running program), the content of files on the endpoint, user accounts on the endpoint and applications installed on the endpoint. Again, such information can be linked with any corresponding activity in the network itself, to provide a rich source of information for analysis.

Such linking can occur within the platform both as part of the real-time joining performed by the joining component 112.

However, network and endpoint events can also be linked together as part of the analysis performed by the analysis engine that is inherently able to consider links between events over longer time-scales, as will now be described.

Event Driven, Case-Based Analysis:

Returning to FIG. 1, the analysis engine, labelled 118, is shown having inputs connected to the event queue 106 and the observation delay line 116 for receiving events for analysis. The events received at the analysis engine 118 from the event queue 106 directly are used, in conjunction with the events stored in the observation delay line 116, as a basis for a sophisticated cyber security analysis that is applied by the analysis engine 118. Queued events as received from the message queue 106 permit real-time analysis, whilst the observation database 116 provides a record of historical events to allow threats to be assessed over longer time scales as they develop.

The analysis applied by analysis engine 118 is an event-driven, case-based analysis as will now be described.

As indicated above, the analysis is structured around cases herein. Cases are embodied as case records that are created in an experience database 124 (which may also be a distributed database).

Case creation is driven by events that are received at the analysis engine from the message queue 106, in real-time or near-real time.

Case creation can also be driven by events that are stored in the observation delay line 116. For example, it may be that an event is only identified as potentially threat-related when that event has been enriched in the second stage enrichment.

Once created, cases are developed by matching subsequent events received from the message queue 106 to existing cases in the experience database 124.

Events stored in the observation delay line 116 may also be matched to existing cases. For example, it may be that the relevance of a historic event only becomes apparent when a later event is received.

Thus, over time, a significant case will be populated with a time sequence of interrelated events, i.e. events that are potentially related to a common security threat, and as such exhibit a potential threat pattern.

Incoming events can be matched to existing cases using defined event association criteria, as applied to the content of the events—in particular the timestamps, but also other information such as entity identifiers (device identifier, IP address etc.). These can be events in the event queue 106, the observation delay line 116, or spread across both. Three key pieces of metadata that are used as a basis for linking events in this way are:
  timestamps,
  endpoint devices, and/or specific endpoint information such as:
    endpoint host name
    endpoint open sockets
    IP address.

These can be multiple pieces of metadata of each type, for example source and destination IP addressed. Such metadata of cases is derived from the event or events on which the case is based. Note the above list is not exhaustive, and the types of data can be used as a basis for event linking.

For example, events may be associated with each other based on IP address where a source IP address in one event matches a destination IP address in another, and those events are within a given time window. IP addresses provide one mechanism by which endpoint events can be matched with related network events.

As another example, open sockets on an endpoint are a valuable piece of information in this context, as they are visible to the endpoint agent on the endpoint and associate specific processes running on that endpoint with specific network connections ("conversations"). That is, a socket associated with a process running on an endpoint (generally the process that opened the socket) can be associated with a specific five-tuple at a particular moment in time. This in turn can be matched to network activity within that conversation, for example by matching the five-tuple to the header data of packets tapped from the network. This in turn allows that network activity to be matched to a specific socket and the process associated with it. The endpoint itself can be identified by host name, and the combination of host name, five tuple and time is unique (and in many cases the five tuple and time will be unique depending on the network configuration and where the communication is going). This may also make use of the time-stamps in the network and endpoint events, as the association between sockets and network connections is time limited, and terminates when a socket is closed.

As noted already, in networking, a five-tuple is a tuple of (source IP, destination IP, source port, destination port, transport protocol). This uniquely identifies a network connection within relatively small time windows. In order to match events based on network connection, a hash of the five tuple can be computed from all network data and from endpoint process connection data (data relating to the network conversations individual processes on the endpoint are engaged in). By ensuring that all endpoint data also contains the host name (derived from the endpoint software), this allows any network event to be correlated with any endpoint event (network 5 tuple hash→endpoint 5 tuple hash→host name) and vice versa. This provides an efficient mechanism for linking specific network connections to specific programs (processes). Such techniques can also be used to link network activity to other event description data, e.g. a specific user account on an endpoint.

As noted, each case is assigned at least one threat score, which denotes the likelihood of the threat hypothesis (or threat hypotheses) to which the case relates. Significance in this context is assessed in terms of threat scores. When the threat score for a case reaches a significance threshold or meets some other significance condition, this causes the case to be rendered accessible via a case user interface (UI) 126.

Access to the cases via the case UI 126 is controlled based on the threat scores in the case records in the experience database 124. A user interface controller (not shown) has access to the cases in the experience database 124 and their threat scores, and is configured to render a case accessible via the case UI 126 in response to its threat score reaching an applicable significance threshold.

Such cases can be accessed via the case UI 126 by a human cyber defence analyst. In this example, cases are retrieved from the experience database 124 by submitting query requests via a case API (application programming interface) 128. The case (UI) 126 can for example be a web interface that is accessed remotely via an analyst device 130.

Thus within the analysis engine there are effectively two levels of escalation:-
Case creation, driven by individual events that are identified as potentially threat-related.
Escalation of cases to the case UI 126, for use by a human analyst, only when their threat scores become significant, which may only happen when a time sequence of interrelated events has been built up over time As an additional safeguarding measure, the user interface controller may also escalate a series of low-scoring cases related to a particular entity to the case UI 126. This is because a series of low-scoring cases may represent suspicious activity in themselves (e.g. a threat that is evading detection). Accordingly, the platform allows patterns of low-scoring cases that are related by some common entity (e.g. user) to be detected, and escalated to the case UI 126. That is, information about a set of multiple cases is rendered available via the case US 126, in response to those cases meeting a collective significance condition (indicating that set of cases as a whole is significant).

The event-driven nature of the analysis inherently accommodates different types of threats that develop on different time scales, which can be anything from seconds to months. The ability to handle threats developing on different timescales is further enhanced by the combination or real-time and non-real time processing within the system. The real-time enrichment, joining and providing of queued events from the message queue 106 allows fast-developing threats to be detected sufficiently quickly, whilst the long-term storage of events in the observation delay line 116, together with batch enrichment, provide a basis for non-real time analysis to support this.

The above mechanisms can be used both to match incoming events from the message queue 106 and events stored in the observation delay line 116 (e.g. earlier events, whose relevance only becomes apparent after later event(s) have been received) to cases. Appropriate timers may be used to determine when to look for related observations in the observation delay line 116 based on the type of observation, after an observation is made. Depending on the attacker techniques to which a particular observation relates, there will be a limited set of possible related observations in the observation delay line 116. These related observations may only occur within a particular time window after the original observation (threat time window). The platform can use timers based on the original observation type to determine when to look for related observations. The length of the timer can be determined based on the threat hypothesis associated with the case.

Analysis Framework:

The analysis engine is shown to comprise a machine reasoning framework 120 and a human reasoning framework 122. The machine reasoning framework 120 applies computer-implemented data analysis algorithms to the events in the observation delay line 116, such as ML techniques.

Individual observations may be related to other observations in various ways but only a subset of these relationships will be meaningful for the purpose of detecting threats. The analysis engine 118 uses structured knowledge about attacker techniques to infer the relationships it should attempt to find for particular observation types.

This can involve matching a received event or sets of events to known tactics that are associated with known types of attack (attack techniques). Within the analysis engine 118, a plurality of analysis modules ("analytics") are provided, each of which queries the events (and possibly other data) to detect suspicious activity. Each analytic is associated with a tactic and technique that describes respective activity it can find. A hypothesis defines a case creation condition as a "triggering event", which in turn is defined as a specific analytic result or set of analytic results that triggers the creation of a case (the case being an instance of that hypothesis). A hypothesis also defines a set of possible subsequent or prior tactics or techniques that may occur proximate in time to the triggering events (and related to the same, or some of the same, infrastructure) and be relevant to proving the hypothesis. Because each hypothesis is expressed as tactics or techniques, there may be many different analytics that can contribute information to a case. Multiple hypotheses can be defined, and cases are created as instances of those hypotheses in dependence on the analysis of the events. Tactics are high level attacker objectives like "Credential Access", whereas techniques are specific technical methods to achieve a tactic. In practice it is likely that many techniques will be associated with each tactic.

For example, it might be that after observing a browser crashing and identifying it as a possible symptom of a "Drive-by Compromise" technique (and creating a case in response), another observation proximate in time indicating the download of an executable file may be recognized as additional evidence symptomatic of "Drive-by Compromise" (and used to build up the case). Drive-by Compromise is one of a number of techniques associated with an initial access tactic.

As another example, an endpoint event may indicate that an external storage device (e.g. USB drive) has been connected to an endpoint and this may be matched to a potential a "Hardware Additions" technique associated with the initial access tactic. The analysis engine 118 then monitors for related activity such as network activity that might confirm whether or not this is actually an attack targeting the relevant infrastructure.

This is performed as part of the analysis of events that is performed to create new cases and match events to existing cases. As indicated, this can be formulated around the "MITRE ATT&CK framework". The MITRE ATT&CK framework is a set of public documentation and models for cyber adversary behaviour. It is designed as a tool for cyber security experts. In the present context, the MITRE framework can be used as a basis for creating and managing cases. In the context of managing existing cases, the MITRE framework can be used to identify patterns of suspect (potentially threat-related behaviour), which in turn can be used as a basis for matching events received at the analysis engine 118 to existing cases. In the context of case creation, it can be used as a basis for identifying suspect events, which in turn drives case creation. This analysis is also used as a basis for assigning threat scores to cases and updating the assigned threat scores as the cases are populated with additional data. However it will be appreciated that these principles can be extended to the use of any structured source of knowledge about attacker techniques. The above examples are based on tactics and associated techniques defined by the Mitre framework.

Case Content:

Each case record is populated with data of the event or events which are identified as relevant to the case. Preferably, the events are captured within the case records such that a timeline of the relevant events can be rendered via the case UI 126. A case provides a timeline of events that have occurred and a description of why it is meaningful, i.e. a description of a potential threat indicated by those events.

In addition to the event timeline, a case record contains attributes that are determined based on its constituent events. Four key attributes are:

people (users)
processes
devices
network connections

A case record covering a timeline of multiple events may relate to multiple people, multiple devices and multiple users. Attribute fields of the case record are populated with these attributed based on its constituent events.

A database case schema dictates how cases are created and updated, how they are related to each other, and how they are presented at the case UI 126.

Case User Interface:

FIG. 5 shows an example of a page rendered by the case UI 126 at the analyst device 130. A list of cases 502 is shown, each of which is selectable to view further details of the case in question. Cases are only displayed in the case list 502 if their respective threats scores have reached the required thresholds. The cases in the case list 502 are shown ordered according to threat score. By way of example, the first case 504 in the case list 502 has a threat score of 9.6 (labelled as element 506). Further details of the currently selected case are shown in a region 508 adjacent to the case list 502. In particular, a timeline 510 of the events on which the case is based is shown. That is, the events with which the case is populated in the experience database 124. In addition, a graphical illustration 512 of network components to which those events relate is shown in association with the timeline 510. This can, for example, include endpoints, infrastructure components, software components and also external components which components of the network are in communication with. Additional information that is relevant to the case is also shown, including a threat summary 514 that provides a natural language summary of the threat to which the case relates. This additional information is provided in the form of "widgets" (separable threat information elements), of which the threat summary 514 is one.

As shown in FIGS. 5A through 5E, the timeline 510 comprises selectable elements corresponding to the underlying events, which are labelled 510a to 510e respectively. This can be seen, selecting these timeline elements causes the accompanying graphical representation 512 to be updated to focus on the corresponding network components. The widgets below the timeline are also updated to show the information that is most relevant to the currently selected timeline element.

Enrichment Micro Services:

Returning to FIG. 1, micro services 138 are provided, from which enrichment data can be obtained, both by the batch enrichment framework 134 (second stage enrichment) and the enrichment component 110 (first stage enrichment). These can for example be cloud services which can be queried based on the events to obtain relevant enrichment data. The enrichment data can be obtained by submitting queries to the micro services based on the content of the events. For example, enrichment data could be obtained by querying based on IP address (e.g. to obtain data about IP addresses known to be malicious), file name (e.g. to obtain data about malicious file names) etc.

Hunting Ground:

In addition to the case UI 126, a "hunting" UI 140 is provided via which the analyst can access recent events from the message queue 106. These can be events which have not yet made it to the observation delay line 116, but which have been subject to first stage enrichment and correlation at the event enhancement system 108. Copies of the events from the message queue 106 are stored in a hunting ground 142, which may be a distributed database and which can be queried via the hunting UI 140. This can for example be used by an analyst who has been alerted to a potential threat through the creation of a case that is made available via the case UI 126, in order to look for additional events that might be relevant to the potential threat.

In addition, copies of the raw network data itself, as obtained through tapping etc., are also selectively stored in a packet store 150. This is subject to filtering by a packet filter 152, according to suitable packet filtering criteria, where it can be accessed via the analyst device 130. An index 150a is provided to allow a lookup of packet data 150b, according to IP address and timestamps. This allows the analyst to trace back from events in the hunting ground to raw packets that relate to those events, for example.

In the above, events are subject to enrichment performed in multiple stages. First-stage enrichment (block 110, FIG. 1) is applied initially to the events before they are stored in an observation database (observation delay line 116). Thereafter second stage, batch enrichment (block 132) is performed to the events stored therein. The external reconnaissance-based enrichment of this disclosure can be performed at either of both of those enrichment stages. Linking of network and endpoint events is also performed at multiple stages (including as part of the case-based analysis itself), as disclosed therein.

Figure 7:
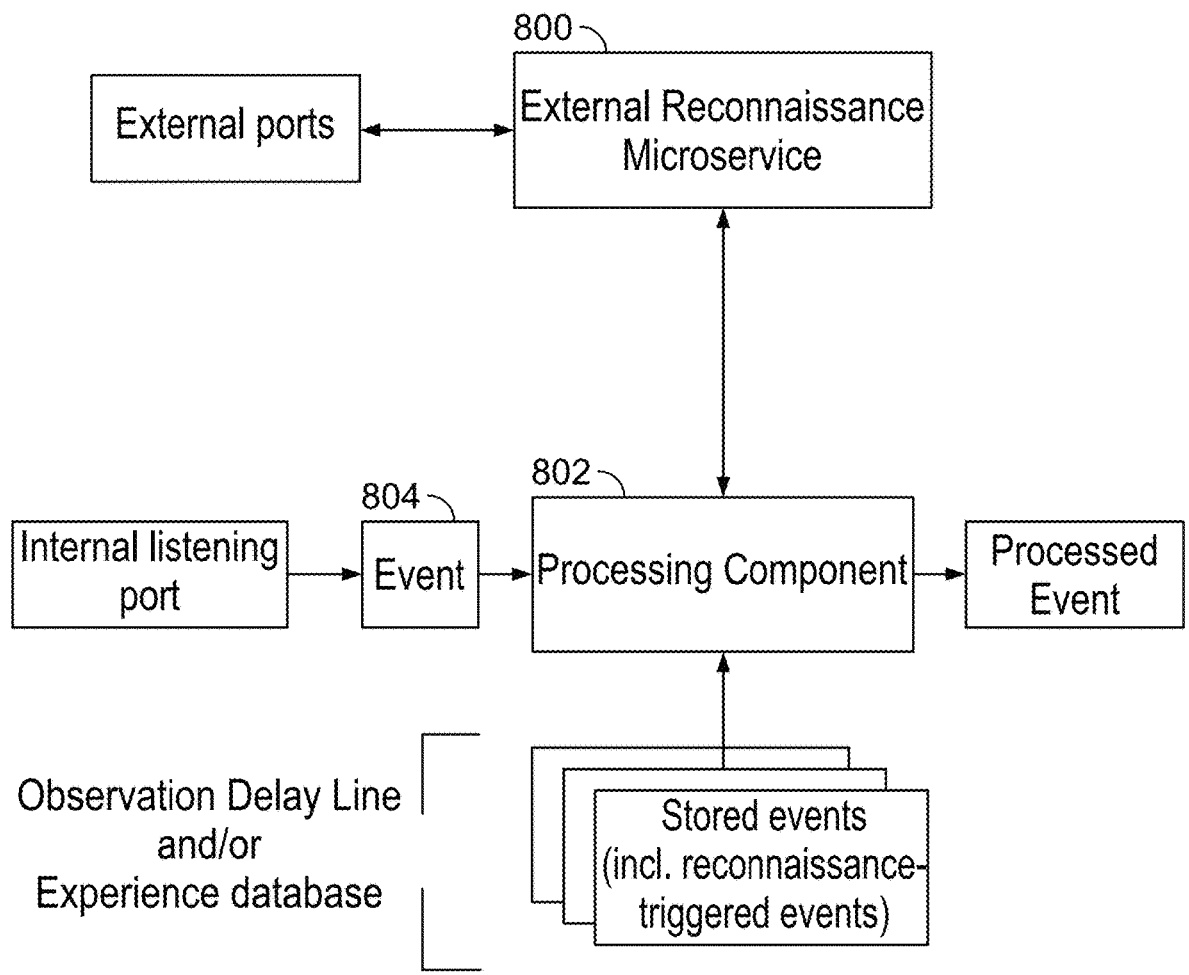
FIG. 7 shows a highly schematic block diagram for an event processing scenario.

Various microservices are described above. The external reconnaissance functions of this disclosure can be provided by an external reconnaissance microservice of the microservices 138, which causes reconnaissance messages to be transmitted to the public side of the network. The external reconnaissance microservice is shown in FIG. 7 and denoted by reference numeral 800.

Example Scenarios

To further illustrate some of the above concepts, some non-exhaustive example scenarios will now be considered.

Figure 6:
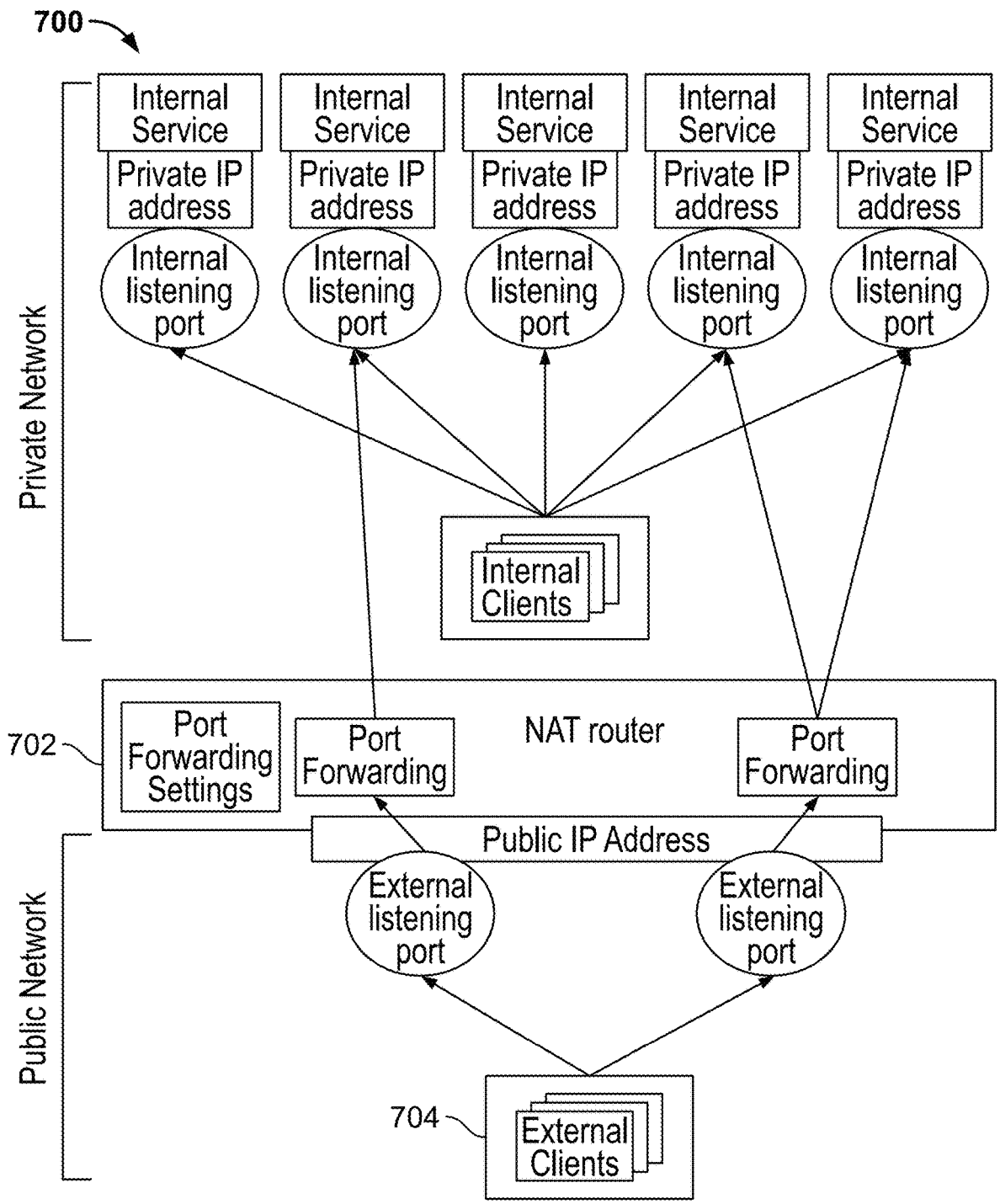
FIG. 6 shows an example deployment of a private network connected to a public network via a router that operates as a NAT.

To aid illustration, accompanying FIG. 6 shows an example deployment of a private network connected to a public network via a router that operates as a NAT 702. The private network has internal services 700, which in turn have respective private IP addresses that are accessible to internal clients on respective internal listening ports associated with those private IP addresses. The NAT 702 has port forwarding settings and, in accordance therewith, implements port forwarding to a subset of the internal ports from respective external ports on the public side of the NAT 702 (i.e. ports associated with a public IP address on the public interface of the NAT). Hence, the corresponding subset of internal services (i.e. having that subset of internal ports) can be reached by external clients 704 on the public network on those external ports, which in turn means those external ports are also in a listening state. The remaining internal services are not accessible to external clients.

Accompanying FIG. 7 shows a highly schematic block diagram for an event processing scenario. An event 804 is received at an event processing component 802. A function performed by the processing component 802 is one of automatically associating relevant external reconnaissance data with the received event 804. The processing component 802 determines that the event 804 is associated with an internal port in a listening state. For example, the event 804 may be a network event, which may have been generated in response to the port entering a listening state (i.e. when an internal service started listening on that port). This indicates an internal service (of the internal services 700) is listening on the internal port and as such may accept incoming connections from internal clients. However, that does not necessarily mean that it can receive incoming connections from the public network. As noted, this would require the NAT 702 to be forwarding an external port on the public interface to the internal port in question. Hence the external reconnaissance service (micro service) 800 is provided which the processing component 802 can use to determine whether or not there exists an external listening port corresponding to the internal listening port with which the event is associated. The external reconnaissance micro service 800 is provided using at least one external reconnaissance device on the public network that can perform external reconnaissance of the kind described above.

Information about the port forwarding settings at the NAT 702 can be used to the extent that information is available (if at all). However, the following does not assume that this information is available nor does it assume that, if it is available, that it is completely reliable. A typical scenario in practice is that the port forwarding settings are not directly visible to the external reconnaissance micro service, but that some information about expected port forwarding settings (which may not be completely accurate or reliable) is provided, e.g. by an operator of the private network. Where available, such information can be used to target external reconnaissance appropriately. This can be supplemented by batch port scanning over all (or at least a wide range) external ports, e.g. on a weekly basis or at other suitably regular intervals. The process can also be guides by certain assumptions (see below). The upshot is that the external reconnaissance micro service has a reasonable level of knowledge about which external ports are is a listening states-referred to as "candidate" external ports below.

The task is then to determine which of these candidate external listening ports, if any, corresponds to the internal listening port associated with the event to be processed.

Figure 8:
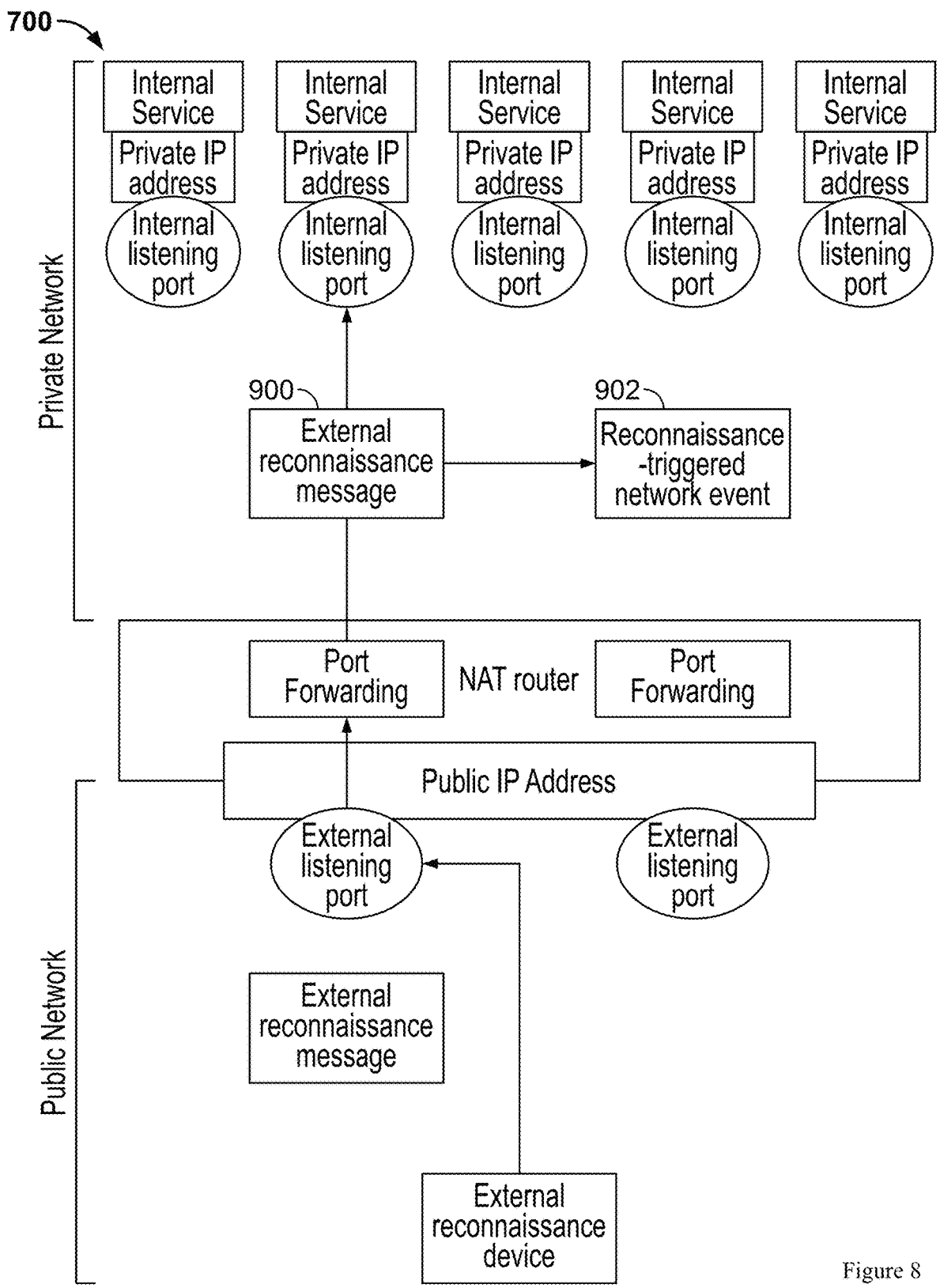
FIG. 8 is schematically illustrates how correspondence between an internal listening port and an external listening port can be determined.

With reference to FIG. 8, correspondence between an internal listening port and an external listening port can be determined by matching known activity at (or otherwise relating to) the external listening port to corresponding activity at (or otherwise relating to) the internal listening port. In particular, if an external reconnaissance message 900 (such as a connection request) is sent to the external port and that message arrives at the internal listening port in question, that implies a correspondence between those ports. In the present system, the arrival of the external reconnaissance message 900 at an internal listening port may result in the generation of a network event 902 that is collected as part of the process of monitoring the private network. Hence correspondence between an internal and an external listening port can be established in the present system based on an internal network event 902 that has been generated in response to an external reconnaissance operation (e.g. in response to an external reconnaissance message 900 that was forwarded to an internal listening port within the private network). Such an event may be referred to herein as a "reconnaissance-triggered network event". Such events can be stored for use by the processing component as shown in FIG. 7. For instance, in the above system, such events are stored in the observation delay line 116 and the experience database 124. The received event 804 of FIG. 7 is not necessarily a reconnaissance-triggered network event itself, but may be matched to a reconnaissance-triggered network event 900 by matching the internal ports to which those events relate.

A reconnaissance-triggered network event 900 can be matched to an external reconnaissance operation in various ways, e.g. based on time stamps and/or related entity identifiers. For example, the reconnaissance-triggered network may comprise a timestamp which can be matched to a timing of the external reconnaissance message. The reconnaissance-triggered event may also comprise a source (IP, port, transport protocol) triple (as determined from the external reconnaissance message once it entered the private network), which can be matched to the (IP, port, transport protocol) used by the external reconnaissance service to send the external reconnaissance message.

Returning to FIG. 7, the processing component may make use of information it obtains from the external reconnaissance micro service and/or stored reconnaissance-triggered network events to obtain external reconnaissance data that is relevant to the event in question Here, prior knowledge and/or reasonable assumptions can be leveraged for improved efficiency. For example:

If the information that is available about the port forwarding settings identifies a specific external port (or range of external ports) that the internal listening port in question is expected to correspond to, then it is straightforward to verify that correspondence based on a scan(s) of the identified external port(s). If that scan (or one of those scans) has resulted in corresponding activity at the internal port in question that means the internal port is reachable via that external port. This external scan(s) can be a targeted scan performed on the identified external port(s) in response to receiving the event, or this information can be used to efficiently locate the results of an earlier scan(s) on that external port(s) and any resulting reconnaissance-triggered network event(s).

Reasonable assumptions may be made about the relationships between internal and external listening ports. For example, initial checks may be made for an external port having the same port number as the internal port in question (which is not guaranteed, but is sometimes adopted for convenience). As another example, initial checks may be made for certain port(s) depending on the type of service in question, e.g. for a web service, external port(s) 80, 443 and/or 8080 may be checked first, as there is a strong convention that these are used for web services.

The level of information that can be ascertained may vary depending on the circumstances. For instance, at one end of the spectrum, it may not be possible to conclusively associate the internal listening port to a specific external listening port, but it may none the less be possible to associate relevant information with the event. For example, if the event relates to an internal web service, external reconnaissance may reveal that there is at least one web service within the private network that is publicly accessible. For whatever reason, it may not be possible to determine for certain that those are the same web services, but the fact that there are externally accessible web service(s) is nonetheless still relevant to the event in question.

At the other end of the spectrum, it may not only be possible to identify that a specific internal web service is externally accessible, but it may also be possible for the external reconnaissance micro service to obtain available web content from that service, which in turn can be provided to the processing component. In that case, the processing component not only knows that a service is accessible, but also obtains details of the service. This could for example identify what software is running, and what version of software (which in turn may reveal a vulnerability, e.g. if out of date software is running). As will be appreciated, these are just two examples, and the level and nature of information that may be obtained can vary significantly depending on the circumstances.

The processing component 802 of FIG. 8 can be an enrichment component which enriches events based on external reconnaissance, at either of the enrichment stages of FIG. 1 (see above).

The processing component 802 can also be a component which links together events. For example, it could link the received event with a reconnaissance-triggered network event. For example, the received event may be a network or endpoint event associated with a particular entity (e.g. internal port/transport protocol), and may be linked with a reconnaissance-triggered network event associated with the same entity. As described in the context of the above system, this could be at an event joining stage (when the events in question are joined together) or part of event analysis.

It will be appreciated that, whilst the specific embodiments of the invention have been described, variants of the described embodiments will be apparent to the skilled person. The scope of the invention is not defined by the described embodiments but only by the appendant claims.

The invention claimed is:

1. A system for detecting security threats, the system comprising:
one or more processors configured to execute program instructions, which, when executed, cause the one or more processors to implement operations comprising:
in an enrichment stage, receiving events pertaining to a monitored private network;
enriching the events by augmenting them with enrichment data; and
receiving, at an analysis engine, the enriched events and analysing the enriched events to detect security threat conditions indicated by the enriched events;
wherein at least one of the events is enriched based on external reconnaissance by:
extracting, from the at least one event, a private network address within the private network;
determining from the private network address a related public network address corresponding to the private network address, the related public address on a network interface between the private network and a public network, and
augmenting the event with external reconnaissance data, as determined by transmitting at least one reconnaissance message from an external reconnaissance device on the public network to the related public network address on the network interface between the public and the private networks.

2. The system of claim 1, wherein the events comprise at least one of:
network events generated by monitoring network traffic within the private network, and
endpoint events generated using endpoint agents executed on endpoints of the monitored private network to monitor local activity at those endpoints.

3. The system of claim 2, wherein the events comprise network events and endpoint events and said operations comprise linking network events and endpoint events together based on at least one of: respective timestamps and respective entity identifiers in those events, wherein the security threat conditions are detected from the enriched and linked events.

4. The system of claim 2, wherein the event that is enriched based on external reconnaissance is:
a network event that is linked with one or more related endpoint events,
an endpoint event that is linked with one or more related network events, or
a joined network event created by joining two or more events together, the two or more events comprising a network event and an endpoint event.

5. The system of claim 1, wherein the external reconnaissance message is transmitted to a port associated with the public network address.

6. The system of claim 1, wherein the enriched event is associated with an internal port, wherein the external reconnaissance data is obtained by matching activity at the internal port to the external reconnaissance message.

7. The system of claim 1, said operations comprising attempting to obtain the external reconnaissance data in response to determining that the event is associated with an internal port in a listening state.

8. The system of claim 1, wherein the external reconnaissance data indicates whether or not an internal port with which the event is associated has been determined to correspond to an external port in a listening state.

9. The system of claim 8, wherein the external reconnaissance data comprises content obtained by the external reconnaissance device from an entity in the private network that is listening on the external port, or information about such content.

10. The system of claim 1, wherein the external reconnaissance message is transmitted as part of a port scan operation, to determine information about a state of an external port associated with the public network address on the network interface, the external reconnaissance data comprising results of the port scan operation.

11. The system of claim 1, wherein the external reconnaissance message is sent in an attempt to connect to a port associated with the public network address, so as to determine information about any software listening on that port, wherein the external reconnaissance data comprises that information.

12. One or more non-transitory computer-readable media comprising computer-executable instructions that, when executed on one or more processors, to cause the one or more processors to implement operations comprising:
in an enrichment stage, receiving events relating to a monitored private network;
enriching the events by augmenting them with enrichment data; and
receiving, at an analysis engine, the enriched events and analysing the enriched events to detect security threat conditions indicated by the enriched events;
wherein at least one of the events is enriched based on external reconnaissance by:
extracting from the at least one event a private network address within the private network;
determining from the private network address a related public network address corresponding to the private network address, the related public address on a network interface between the private network and a public network, and
augmenting the event with external reconnaissance data, as determined by transmitting at least one reconnaissance message from an external reconnaissance device on the public network to the related public network address on the network interface between the public and the private networks.

13. The one or more non-transitory computer-readable media of claim 12, wherein the events comprise at least one of:
network events generated by monitoring network traffic within the private network, and endpoint events generated using endpoint agents executed on endpoints of the monitored private network to monitor local activity at those endpoints.

14. The one or more non-transitory computer-readable media of claim 13, wherein the events comprise network events and endpoint events and said operations comprise linking network events and endpoint events together based on at least one of: respective timestamps and respective entity identifiers in those events, wherein the security threat conditions are detected from the enriched and linked events.

15. The one or more non-transitory computer-readable media of claim 13, wherein the event that is enriched based on external reconnaissance is:
a network event that is linked with one or more related endpoint events, an endpoint event that is linked with one or more related network events, or a joined network event created by joining two or more events together, the two or more events comprising a network event and an endpoint event.

16. The one or more non-transitory computer-readable media of claim 12, wherein the external reconnaissance message is transmitted to a port associated with the public network address.

17. A system for detecting security threats, the system comprising:
one or more processors configured to execute program instructions, which, when executed, cause the one or more processors to implement operations comprising:
in an enrichment stage, receiving events pertaining to a monitored private network;
enriching the events by augmenting them with enrichment data; and
receiving, at an analysis engine, the enriched events and analysing the enriched events to detect security threat conditions indicated by the enriched events;
wherein at least one of the events is enriched based on external reconnaissance by:
determining a related public network address on a network interface between the private network and a public network, and
augmenting the event with external reconnaissance data, as determined by transmitting at least one reconnaissance message from an external reconnaissance device on the public network to the related public network address on the network interface between the public and the private networks, the at least one reconnaissance message being sent in an attempt to connect to a port associated with the public network address, so as to determine information about any software listening on that port, wherein the external reconnaissance data comprises that information.

18. The system of claim 17, wherein the events comprise at least one of: network events generated by monitoring network traffic within the private network, and endpoint events generated using endpoint agents executed on endpoints of the monitored private network to monitor local activity at those endpoints.

19. The system of claim 18, wherein the events comprise network events and endpoint events and said operations comprise linking network events and endpoint events together based on at least one of: respective timestamps and respective entity identifiers in those events, wherein the security threat conditions are detected from the enriched and linked events.

20. The system of claim 18, wherein the event that is augmented based on external reconnaissance is:
a network event that is linked with one or more related endpoint events,
an endpoint event that is linked with one or more related network events, or
a joined network event created by joining two or more events together, the two or more events comprising a network event and an endpoint event.

* * * * *